(12) United States Patent
Bomya

(10) Patent No.: US 7,190,161 B2
(45) Date of Patent: *Mar. 13, 2007

(54) MAGNETIC SENSOR

(75) Inventor: Timothy J. Bomya, Westland, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/666,165

(22) Filed: Sep. 19, 2003

(65) Prior Publication Data

US 2004/0056652 A1   Mar. 25, 2004

Related U.S. Application Data

(63) Continuation-in-part of application No. 09/649,416, filed on Aug. 26, 2000, now Pat. No. 6,777,927.

(60) Provisional application No. 60/151,220, filed on Aug. 26, 1999, provisional application No. 60/151,424, filed on Aug. 26, 1999.

(51) Int. Cl.
  *G01N 27/82* (2006.01)
  *G01R 33/12* (2006.01)
  *G01L 1/12* (2006.01)
  *B60R 21/01* (2006.01)
(52) U.S. Cl. .................................. 324/228; 73/862.69
(58) Field of Classification Search .......... 324/207.17, 324/209, 239, 240, 228, 233, 339, 207.16; 340/573.1, 436, 540, 547; 280/735; 73/862.69
  See application file for complete search history.

(56) References Cited

U.S. PATENT DOCUMENTS

| | | | |
|---|---|---|---|
| 1,613,746 A | 2/1927 | Kinsley | 324/243 |
| 2,552,722 A | 5/1951 | King | 264/1 |
| 3,659,197 A | 4/1972 | Alley | 324/51 |
| 3,835,371 A * | 9/1974 | Mirdadian et al. | 324/329 |
| 3,945,459 A | 3/1976 | Oishi et al. | 180/274 |
| 4,087,782 A | 5/1978 | Oishi et al. | 180/271 |
| 4,178,979 A | 12/1979 | Birat | 164/49 |
| 4,446,741 A | 5/1984 | Sirokorad et al. | 73/654 |

(Continued)

FOREIGN PATENT DOCUMENTS

EP   0 453 824 A1   10/1991

(Continued)

*Primary Examiner*—Edward Lefkowitz
*Assistant Examiner*—Kenneth J. Whittington
(74) *Attorney, Agent, or Firm*—Reggie & Dinnin, P.C.

(57) ABSTRACT

A coil is operatively associated with a magnetic circuit of a vehicle body, and is adapted to cooperate with a time-varying magnetic flux in the vehicle body that is responsive to a condition of the vehicle body sensed by the magnetic sensor. An electrical circuit is operatively coupled to the coil, and the coil in cooperation therewith exhibits a resonant or near-resonant condition in association with the time-varying magnetic flux for at least one condition of the vehicle body. In one embodiment, a signal from an oscillator is applied to the series combination of a capacitor and the coil, which generates an oscillatory magnetic flux in the magnetic circuit. In another embodiment, a second capacitor is connected in parallel with a second coil which operates in a resonant or near-resonant condition responsive to the oscillatory magnetic flux in the magnetic circuit.

31 Claims, 7 Drawing Sheets

U.S. PATENT DOCUMENTS

| | | | | |
|---|---|---|---|---|
| 4,561,314 A | 12/1985 | Alley et al. | | 73/862.69 |
| 4,802,368 A | 2/1989 | Nordvall | | 73/862.69 |
| 4,823,621 A | 4/1989 | Sobel et al. | | 73/862.69 |
| 4,866,418 A | 9/1989 | Dobler et al. | | 340/429 |
| 5,007,295 A | 4/1991 | Gustafsson et al. | | 73/862.69 |
| 5,041,769 A | 8/1991 | Iwai | | 318/254 |
| 5,134,371 A | 7/1992 | Watanabe | | 324/252 |
| 5,144,846 A | 9/1992 | Klauber et al. | | 73/862.336 |
| 5,177,370 A | 1/1993 | Meister | | 307/10.1 |
| 5,276,398 A * | 1/1994 | Withers et al. | | 324/318 |
| 5,297,439 A * | 3/1994 | Tyren et al. | | 73/779 |
| 5,359,286 A | 10/1994 | Kaiser et al. | | 324/207.2 |
| 5,428,534 A * | 6/1995 | Wetzel et al. | | 701/46 |
| 5,437,197 A | 8/1995 | Uras et al. | | 73/862.69 |
| 5,525,907 A * | 6/1996 | Frazier | | 324/334 |
| 5,580,084 A | 12/1996 | Gioutsos | | 280/735 |
| 5,636,863 A | 6/1997 | Reid et al. | | 280/735 |
| 5,646,613 A | 7/1997 | Cho | | 340/903 |
| 5,707,076 A * | 1/1998 | Takahashi | | 280/735 |
| 5,739,757 A | 4/1998 | Gioutsos | | 340/667 |
| 5,747,696 A | 5/1998 | Kwun et al. | | 73/728 |
| 5,760,577 A * | 6/1998 | Shizuya | | 324/207.16 |
| 5,783,871 A | 7/1998 | LeMense | | 307/10.1 |
| 6,039,345 A | 3/2000 | Cech et al. | | 280/735 |
| 6,317,048 B1 | 11/2001 | Bomya et al. | | 340/573.1 |
| 6,407,660 B1 | 6/2002 | Bomya | | 340/436 |
| 6,433,688 B1 | 8/2002 | Bomya | | 340/573.1 |
| 6,552,662 B1 | 4/2003 | Bomya et al. | | 340/572.1 |
| 6,583,616 B1 | 6/2003 | Bomya | | 324/207.17 |
| 6,586,926 B1 | 7/2003 | Bomya | | 324/207.17 |
| 6,587,048 B1 | 7/2003 | Bomya | | 340/573.1 |
| 6,631,776 B1 | 10/2003 | Bomya | | 180/169 |
| 6,777,927 B1 * | 8/2004 | Bomya | | 324/207.17 |

FOREIGN PATENT DOCUMENTS

JP      56-157802      5/1981

* cited by examiner

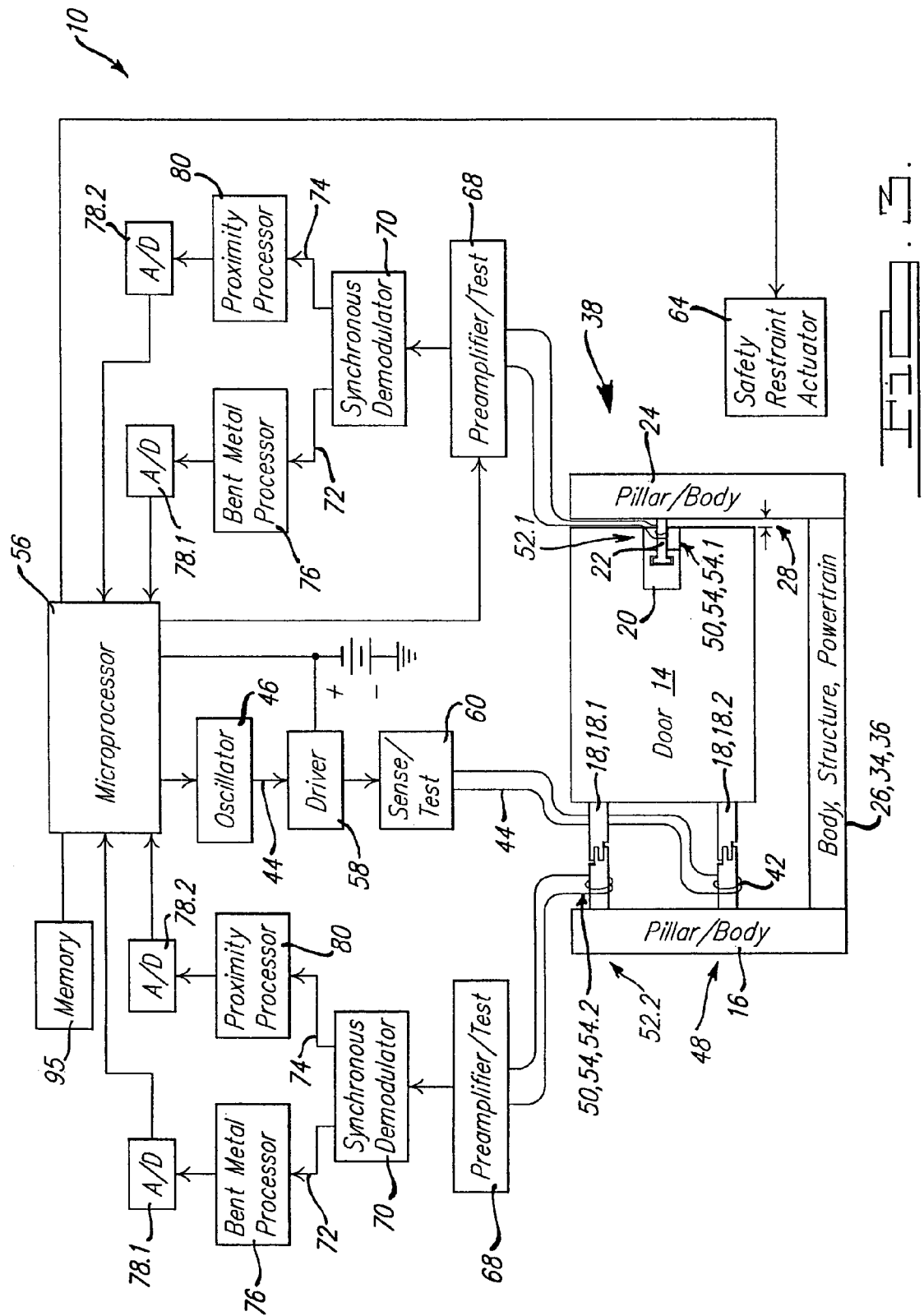

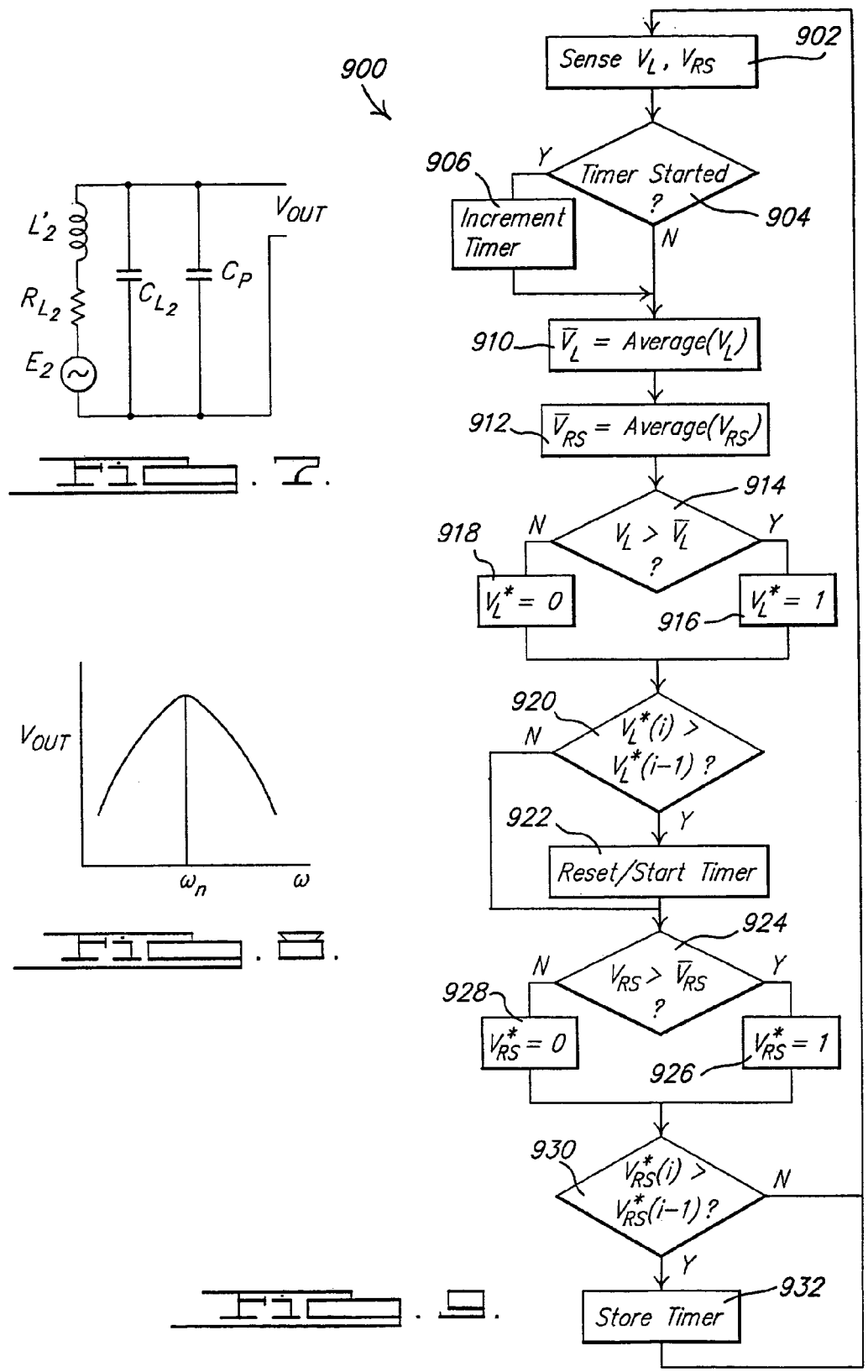

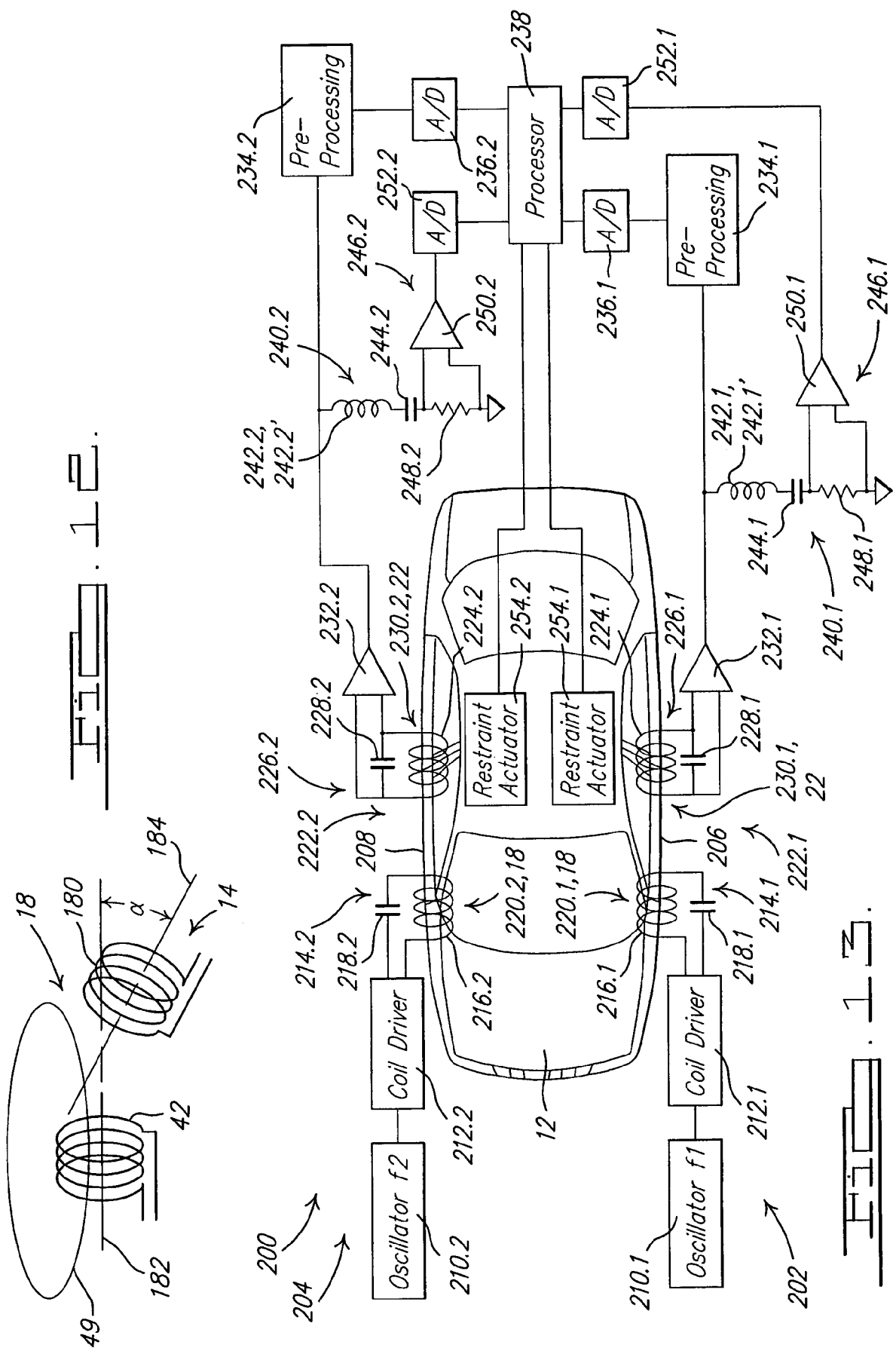

MAGNETIC SENSOR

CROSS-REFERENCE TO RELATED APPLICATIONS

The instant application is a continuation-in-part of U.S. application Ser. No. 09/649,416 filed on Aug. 26, 2000 now U.S. Pat. No. 6,777,927, which claims the benefit of prior U.S. Provisional Application Ser. No. 60/151,220 filed on Aug. 26, 1999, and which claims the benefit of prior U.S. Provisional Application Ser. No. 60/151,424 filed on Aug. 26, 1999, all of which are incorporated herein by reference.

BRIEF DESCRIPTION OF THE DRAWINGS

In the accompanying drawings:

FIG. 3 illustrates a block diagram of another embodiment of a magnetic sensor;
FIG. 7 illustrates a schematic diagram of a second coil and associated capacitor incorporated in a magnetic sensor;
FIG. 8 illustrates a resonant behavior of a second resonant circuit;
FIG. 9 illustrates a process for determining a relative phase difference of two signals;
FIG. 12 illustrates an embodiment for detecting an opening angle of a door;
and
FIG. 13 illustrates an embodiment of a magnetic sensor adapted to sense both sides of a vehicle.

DESCRIPTION OF EMBODIMENT(S)

Figure 1:
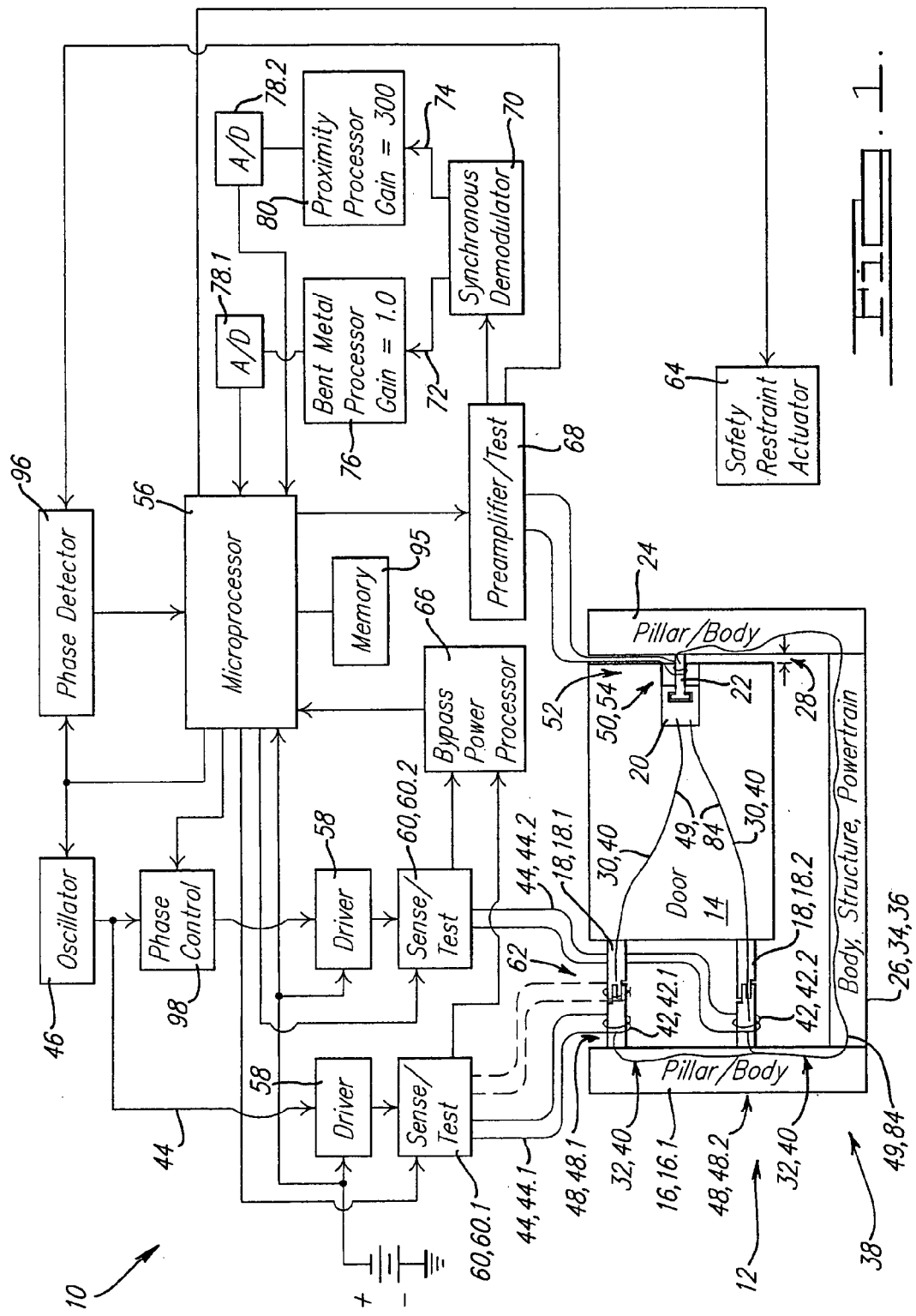
FIG. 1 illustrates a block diagram of a magnetic sensor.

Referring to FIG. 1, a magnetic sensor 10 is incorporated in a vehicle 12 shown schematically comprising a door 14 that hinges with respect to a first pillar 16 about a plurality of hinges 18. The door 14 has a latch/lock mechanism 20 that latches to a striker 22 on a second pillar 24.

The door 14—typically constructed with magnetically-permeable steel—has intrinsic magnetic properties. For example, the door 14 conducts magnetic flux, thereby enabling a permanent magnet to stick thereto. The hinges 18 provide a relatively low reluctance path between the door 14 and the first pillar 16. Moreover, the latch/lock mechanism 20 and the striker 22, when engaged, provide a relatively low reluctance path between the door 14 and the second pillar 24. Elsewhere, the door 14 is normally magnetically separated from the body 26 of the vehicle 12 by an associated air gap 28. Accordingly, the hinges 18 and striker 22 are magnetically connected by a first magnetic path 30 along the door 14. Moreover, the first 16 and second 24 pillars—to which the hinges 18 and striker 22 are respectively attached—are magnetically connected by a second magnetic path 32—distinct from the first magnetic path 30—comprising the body 26, structure 34, or powertrain 36 of the vehicle 12. Accordingly, the door 14 is part of a magnetic circuit 38 that is similar in nature to the core of a transformer, as illustrated in FIG. 1, wherein the first 30 and second 32 magnetic paths together constitute a closed magnetic path 40.

The magnetic circuit 38 further comprises at least one first coil 42 operatively connected to at least one first signal 44, for example an oscillatory signal from an oscillator 46. The at least one first coil 42 is located at an associated at least one first location 48, and responsive to the at least one first signal 44 generates a magnetomotive force in the magnetic circuit 38 so as to generate a magnetic flux 49 therein. At least one magnetic sensing element 50 is operatively connected to the magnetic circuit 38 at an associated at least one second location 52 that is distinct from the at least one first location 48. The at least one magnetic sensing element 50 senses the magnetic flux 49, which is responsive to the magnetomotive force from the at least one first coil 42 and to the magnetic properties of the magnetic circuit 38.

For example, as illustrated in FIG. 1, in a first embodiment, the at least one first coil 42 may comprise a plurality of first coils 42.1, 42.2 at distinct first locations 48.1, 48.2, for example operatively coupled with uniform phasing to the top 18.1 and bottom 18.2 hinges that operatively couple the door 14 to the "A" pillar 16.1. Furthermore, each first coil 42.1, 42.2 may be placed around the associated hinge 18.1, 18.2 or around one or more associated mounting bolts that attach the hinge to the first pillar 16 or to the door 14; and the magnetic sensing element 50 may comprise a second coil 54 around the latch/lock mechanism 20, around the bolts that attach the latch/lock mechanism 20 to the door 14, or around the striker 22; the associated magnetic circuit 38 thereby forming a transformer with two primary windings comprising the first coils 42.1, 42.2; a secondary winding comprising the second coil 54; and a core comprising the first pillar 16, the hinges 18.1, 18.2, the door 14, the second pillar 24, the air gap 28 around the door 14, and the remainder of the body 26, the structure 34 and the powertrain 36 of the vehicle 12. Stated in another way, the first embodiment comprises a transformer with three coils, two of them active and one of them passive.

The first signal 44 comprises a sinusoidal voltage generated by an oscillator 46 comprising a crystal stabilized (i.e. substantially drift-free) TTL square wave signal generated by a microprocessor 56 and subsequently filtered by a band-pass filter. The signal from the oscillator 46 is fed to a coil driver 58—for example, through a buffer amplifier.

The oscillation frequency of the oscillator 46 is selected, as a function of the expected noise sources, to enhance system performance. For example, a frequency different from that of AC power lines (e.g. 60 Hz) could be chosen to avoid interference therefrom. Ultrasonic frequencies appear to be useful. The permeability of typical automotive steel is frequency dependent with a bandwidth of about 100 KHz. The frequency range of the permeability of the associated magnetic circuit 38 can likely be extended to 1 MHz or higher by adding materials such as ferrite or mu-metal thereto.

The skin depth of the magnetic flux 49 is responsive to frequency, so the depth of the magnetic flux 49 in the door 14 and the shape and reach of the associated proximity field can be varied by changing the oscillation frequency (or frequencies). The oscillator 46 may be modulated either in amplitude, frequency, or by bursting.

Each at least one first coil 42 is driven by an associated coil driver 58 that provides sufficient power at an impedance compatible with the first coil 42 so that the resulting magnetic flux 49 is sufficiently strong to be detected by the at least one magnetic sensing element 50. The coil driver 58 is also, for example, provided with short circuit protection and is operated so as to avoid saturation or clipping of the first signal 44. The coil driver 58 is designed to operate in an automotive environment, for example to operate over a associated range of possible battery voltages. The first signal 44 from the coil driver 58 may, for example, be either a voltage signal or a current signal.

The coil driver 58 drives the first coil 42 through a sense/test circuit 60. The sense/test circuit 60 senses either a current or voltage from the first coil 42, or a signal from a supplemental sense coil 62, or a combination of the three, to confirm or test the operation of the first coil 42. This also provides a continuous test of the integrity of the door 14. For example, a supplemental sense coil 62 would directly sense the magnetic flux 49 generated by the first coil 42. The sense/test circuit 60 may also, for example, test the first coil 42 for an open or short so as to improve the reliability of the magnetic sensor 10, particularly when used to control the actuation of a safety restraint actuator 64, so as to prevent a false deployment or a failure to deploy when necessary. The integrity, or health, of the at least one first coil 42 is, for example, tested every measurement cycle.

A plurality of first coils 42 may be driven separately, as illustrated in FIG. 1, or connected in series or parallel and driven by a common coil driver 58. The at least one first coil 42 may, for example, be series resonated to increase the current flow therein, thereby increasing the amount of magnetic flux 49 generated by the at least one first coil 42, and the amount of magnetic flux 49 induced in the magnetic circuit 38. This also increases the magnitude and extent to the leakage field proximate to the air gap(s) 28 of the magnetic circuit 38, thereby extending the range of associated proximity sensing by the magnetic sensor 10. Increased magnetic flux 49 in the magnetic circuit 38 provides for a higher signal-to-noise ratio in the signal or signals received or detected by the magnetic sensor 10. When in series resonance, the inductive reactance of the first coil 42 is canceled by an associated capacitive reactance, so that the resulting total impedance is purely resistive, so that a given operating voltage can be accommodated, or an associated Q of the resonant circuit can be adjusted, either by adjusting the resistance of an associated series resistor or by adjusting the inherent resistance of the first coil 42 (e.g. by adjusting either the size or length, or both, of the conductor thereof). The at least one first coil 42 may be compensated for variations in temperature by incorporating an associated temperature sensor. For a coil mounted around a hinge 18 on the "A" pillar 16.1, the body metal would act as a heat sink to help maintain the temperature of the first coil 42 near ambient temperature.

The sense/test circuit 60 also provides a measure of the power delivered to the first coil 42 so that the magnetic flux 49 coupled to proximate metal objects can be estimated. For example, a steel object such as another vehicle proximate to the door 14 provides an alternate path for magnetic flux 49 from the at least one first coil 42, which affects the magnetic circuit 38 and the reluctance seen by the at least one first coil 42, thereby changing the load on the at least one first coil 42, which changes the power provided thereto by the coil driver 58. Generally, a portion of the magnetic flux 49 generated by the at least one first coil 42 is coupled within the magnetic circuit 38, and a portion bypasses the magnetic circuit 38, whether via an alternate magnetic path or by radiation. The portion of magnetic flux 49 that bypasses the magnetic circuit 38 increases the load upon the coil driver 58, which increase is sensed by a bypass power processor 66 using measurements from the sense/test circuit 60 of the voltage across and the current through the at least one first coil 42. For a plurality of first coils 42, the bypass power processor 66 can provide a measure of direction to a proximate magnetic-field-affecting object from the separate measurements of the associated separate sense/test circuits 60.1 and 60.2, particularly from a measure of the difference in currents flowing to the separate first coils 42.1 and 42.2 for a given common drive voltage.

The at least one magnetic sensing element 50 is responsive to the magnetic flux 49 at the second location 52, including both a first portion of magnetic flux 49 that is conducted through the door 14, and a second portion of magnetic flux 49, i.e. leakage flux, that bypasses at least a portion of the door 14—for example as a result of an object, such as another vehicle proximate to the door 14, that couples magnetic flux 49 from the at least one first coil 42 to the at least one magnetic sensing element 50.

An output from the at least one magnetic sensing element 50 is operatively connected to a preamplifier/test circuit 68 which, for example, buffers the magnetic sensing element 50 from loading by the subsequent circuitry and provides a relatively low impedance output so as to reduce noise. The preamplifier/test circuit 68 also amplifies the signal from the at least one magnetic sensing element 50 to a level sufficiently high to permit appropriate signal processing and demodulation before subsequent analog-to-digital conversion for processing by the microprocessor 56. The microprocessor 56 gathers data, monitors system health and integrity, and determines whether or not to actuate the safety restraint actuator 64.

The preamplifier/test circuit 68 also monitors the integrity of the magnetic sensing element 50, for example by comparing the signal therefrom with "expected" levels and expected wave shapes (e.g. a sinusoidal shape). This provides a continuous test of the integrity of the magnetic sensing element 50 and the magnetic transfer function property of the door 14. The preamplifier/test circuit 68 may also, for example, test the at least one magnetic sensing element 50, for example a second coil 54, for an open or short so as to improve the reliability of the magnetic sensor 10, particularly when used to control the actuation of a safety restraint actuator 64, so as to prevent a false deployment or a failure to deploy when necessary. The integrity, or health, of the at least one magnetic sensing element 50 is tested every measurement cycle.

The magnetic sensing element 50 senses from the magnetic flux 49 proximate thereto a sinusoidal carrier that is modulated responsive to the reluctance of the magnetic circuit 38. This signal from the magnetic sensing element 50 is amplified by the preamplifier/test circuit 68, and a synchronous demodulator 70 operatively connected thereto extracts the modulation signal from the sinusoidal carrier, which modulation signal contains a bent metal signal component 72 and a proximity signal component 74. The bent metal signal component 72 is responsive to the magnetic flux 49 conducted through the metal of the door 14. The proximity signal component 74 is responsive to the leakage magnetic flux 49 that is coupled between the at least one first coil 42 and the magnetic sensing element 50 along a path that bypasses the metal of the door 14. The difference in the relative strengths of the bent metal signal component 72 and a proximity signal component 74 is dependent upon the difference in permeates of the associated magnetic flux paths.

A bent metal processor 76 DC couples—with, for example, unity gain—the bent metal signal component 72 to the microprocessor 56 through an A/D converter 78.1. The bent metal signal component 72 is responsive to the time rate of change of magnetic flux 49 in the door 14. Relatively slow signals of relatively low amplitude correspond to non-deployment events for which a safety restraint actuator 64 should not be deployed, for example a low speed impact of the door 14 by a shopping cart. Relatively fast signals of relatively large amplitude correspond to deployment events for which a safety restraint actuator 64 should be deployed, for example an impact of the door 14 by a pole or barrier (e.g. an FMVSS-214 condition). During a pole crash, the steel of the door 14 becomes magnetically shorted to the adjacent body, thereby magnetically shorting the flux path— as a result of either the magnetic influence of a proximate magnetic object (e.g. a steel pole), or by the physical affect of the impact on the associated magnetic circuit 38—which significantly reduces the magnetic flux 49 sensed by a magnetic sensing element 50 at the striker 22. The magnetic sensing element 50 is responsive to those changes to the magnetic circuit 38 which either increase or decrease the associated magnetic flux 49 sensed thereby.

The proximity processor 80 amplifies the proximity signal component 74 from the synchronous demodulator 70 by some gain factor based on coil geometry and vehicle structure, and DC couples the amplified signal through an A/D converter 78.2. The proximity signal component 74 is responsive to the time rate of change of magnetic flux 49 that bypasses door 14. Notwithstanding a greater susceptibility to noise in comparison with the bent metal signal component 72, the proximity signal component 74 enables the detection of metallic (particularly ferromagnetic) objects that are approaching the door 14, for example a vehicle approaching at high speed or a vehicle in an adjacent lane of traffic. Another vehicle approaching the door 14 on a collision course therewith is indicated by a relatively fast signal, for which a safety restraint actuator 64 would be deployed upon impact if followed by a corresponding bent metal signal component 72.

Accordingly, if the rate of change of the proximity signal component 74 is greater than a first threshold, then the safety restraint actuator 64 is deployed when the bent metal signal component 72 exceeds a second threshold and the rate of change thereof exceeds a third threshold. Otherwise, if no bent metal signature follows, for example if the proximity signal component 74 had resulted from a passing vehicle, then the system stands down.

The above described magnetic sensor 10 can be embodied in various ways. The particular circuitry, whether analog, digital or optical is not considered to be limiting and can be designed by one of ordinary skill in the art in accordance with the teachings herein. For example, where used, an oscillator, amplifier, logic element, modulator, demodulator, A/D converter can be of any known type, for example using transistors, for example field effect or bipolar, or other discrete components; integrated circuits; operational amplifiers, or logic circuits, or custom integrated circuits. Moreover, where used, a microprocessor can be any computing device.

In accordance with the theory of magnetic circuits and transformers, magnetic lines of flux always close on themselves and preferably follow a path of least magnetic resistance, for example so as to follow the path of ferromagnetic materials, such as steel or ferrite materials. Moreover, changes in area or permeability along the magnetic circuit cause a leakage of magnetic flux 49 proximate thereto, which leakage is also known as fringing. A magnetic circuit 38 is characterized by a reluctance $\mathcal{R}$, wherein the amount of magnetic flux $\phi$ in a magnetic circuit for a given magnetomotive force F is given by $\phi=F/\mathcal{R}$. The reluctance $\mathcal{R}$ of a series magnetic circuit is given by the sum of the respective reluctances of the respective elements in series. The reluctance of an air gap is significantly greater than that of a ferromagnetic material, and as a result, the magnetic flux leaks into the space surrounding the air gap, forming a leakage field. A ferromagnetic object entering the leakage field provides an alternate path for the magnetic flux, thereby bypassing the air gap and affecting the reluctance of the magnetic circuit 38. Stated in another way, the leakage flux field changes shape so that the ferromagnetic object becomes part of the magnetic circuit 38.

As illustrated in FIG. 1, a door 14 can be modeled as an element of a closed magnetic circuit 38 that is similar to a transformer core. The fore and aft ends of the door 14 are magnetically connected in series with the remainder of the magnetic circuit 38 by the hinges 18 and the coupling of the latch/lock mechanism 20 to the striker 22. The remainder of the door 14 is magnetically insulated from remainder of the magnetic circuit 38 by an air gap 28 that otherwise surrounds the door 14.

A first coil 42 has a self-inductance which has one value when the first coil is in free space, and another when the coil is operatively connected to a magnetic circuit 38, for example by wrapping the first coil 42 around a portion of the magnetic circuit 38. In the latter case, the self inductance of the first coil 42 is dependent upon the magnetic properties of the magnetic circuit 38. Moreover, the magnetic properties of the magnetic circuit 38 are altered if the magnetic circuit 38 is physically deformed, or if ferromagnetic elements are brought in proximity with the magnetic circuit 38, particularly in proximity with the leakage fields thereof. Accordingly, a deformation of the door 14 or the approach of another vehicle to the door 14 are both examples of perturbations to the magnetic properties of the magnetic circuit 38, both of which can be detected by either a change in inductance of the first coil 42, or by a change in the magnetic coupling between a first coil 42 at a first location 48 and a magnetic sensing element 50 for sensing the magnetic flux 49 in the magnetic circuit 38 at a second location 52 distinct from the first location 48.

Figure 2A:
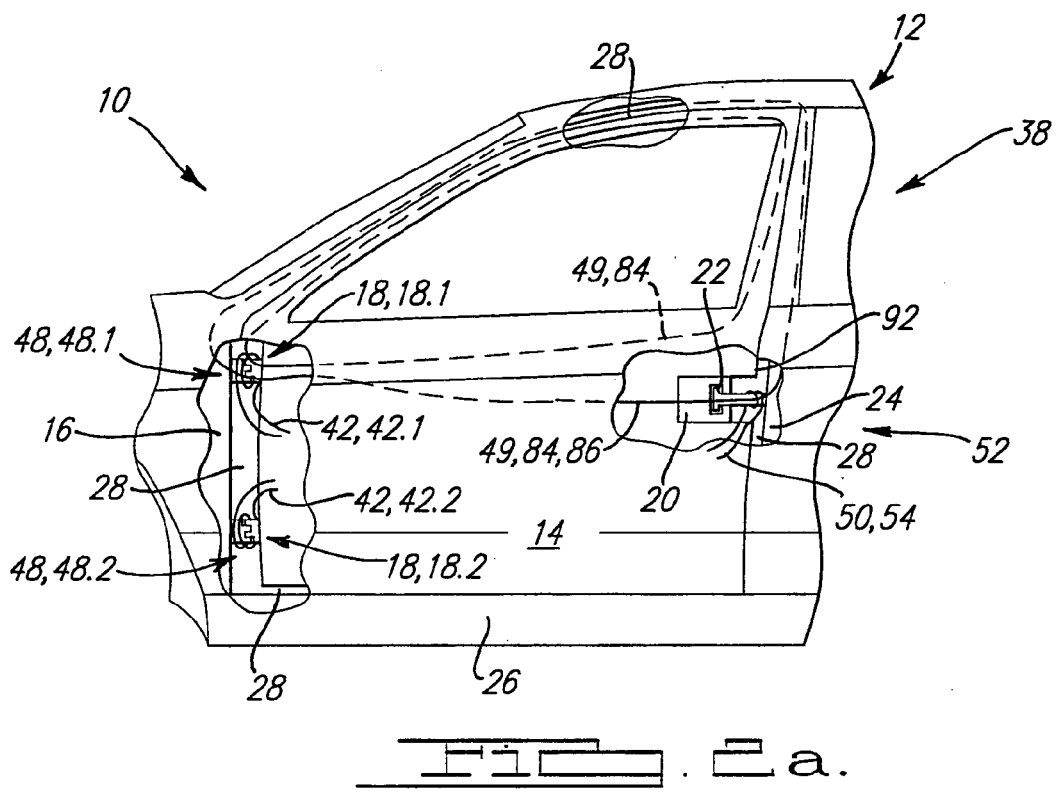
FIG. 2a illustrates a side view of a magnetic circuit.
Figure 2B:
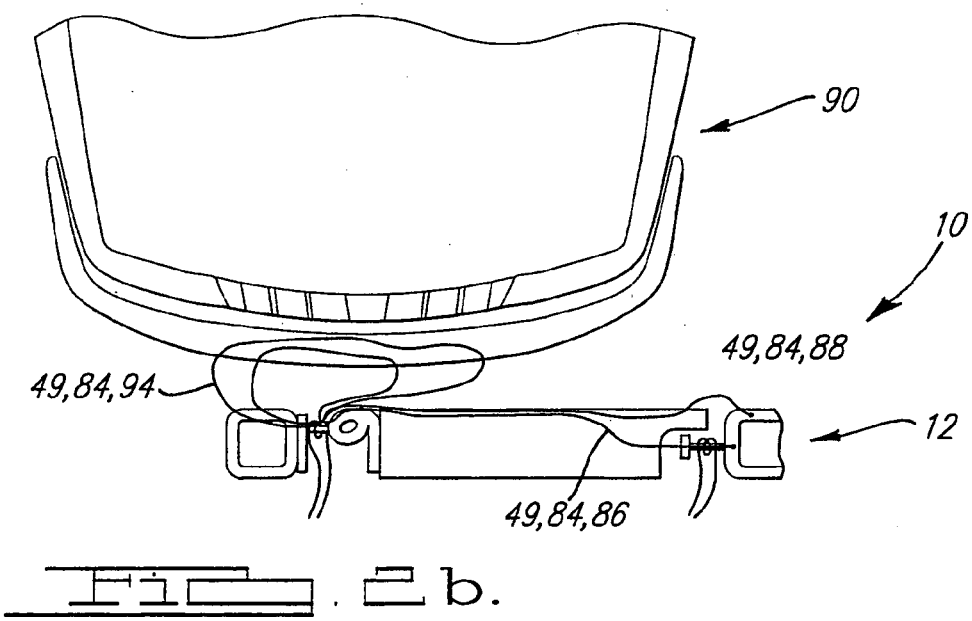
FIG. 2b illustrates a top view of a magnetic circuit.

In operation, the at least one first signal 44 operatively coupled to the associated at least one first coil 42 by the associated at least one coil driver 58 causes a current flow in the at least one first coil 42 which generates a magnetic flux 49 therein, which in turn generates a magnetic flux 49 in the magnetic circuit 38 to which the at least one first coil 42 is coupled. The magnetic flux 49 is conducted by the door 14, which is a part of the magnetic circuit 38. The at least one first signal 44 comprising an oscillating signal, for example a sinusoidal voltage or current excitation, is applied to at least one first coil 42 operatively coupled to a hinge 18 of a door 14. Referring to FIGS. 2*a* and 2*b*, the at least one first coil 42 converts the at least one first signal 44 into magnetic flux 49, which is then induced in the magnetic circuit 38 by virtue of the at least one first coil 42. The magnetic flux 49 comprises a plurality of magnetic flux lines 84, some of which may leak out beyond the physical boundary of the magnetic circuit 38, particularly at locations proximate to air gaps 28 in the magnetic circuit 38. The magnetic flux lines 84 follow steel and other ferromagnetic elements of the door 14 that attract magnetic flux 49 therein in relation to the permeance thereof in comparison with the substantially lower permeance of the surrounding air.

The at least one first signal 44 from the oscillator 46 is amplified by the associated at least one coil driver 58 and operatively coupled to the at least one first coil 42 through an associated sense/test circuit 60. The at least one first coil 42 generates a magnetic flux 49 in the magnetic circuit 38, particularly the door 14, and at least a portion of the magnetic flux 49 is sensed by the magnetic sensing element 50, for example by a second coil 54 wrapped around the striker 22.

The magnetic flux 49 travels through the magnetic circuit 38, particularly the ferromagnetic portions thereof including those of the portions of the vehicle 12, such as the door 14, that are monitored by the magnetic sensor 10. A first portion 86 of the magnetic flux 49, known herein as the bent metal flux component 86, passes through the ferromagnetic elements of the magnetic circuit 38 and is sensed by the magnetic sensing element 50, which provides a first signal component 72 known herein as a bent metal signal component 72 that is responsive thereto, or in other words, that is responsive to changes of the magnetic characteristics of the magnetic circuit 38. The magnetic flux 49 seeks to travel inside the steel structure of the door 14. More magnetic flux 49 automatically enters those parts of the steel that are thicker, which would likely correspond to those elements of the door structure that add strength to the door 14. Where the steel is thinner, the magnetic flux density is correspondingly reduced. Stated in another way, the magnetic flux 49 travels in ratiometric proportion with the cross-sectional area of the steel. The magnetic flux 49 is generally not present in the plastic parts other than as a result of leakage elsewhere in the magnetic circuit 38, however, for a steel door 14, these parts are generally not structural. Accordingly, the magnetic sensor 10 generates magnetic flux 49 that passes through the structural elements of the door 14, and is responsive to mechanical changes to these structural elements to a degree that those mechanical changes influence the magnetic flux 49.

A second portion 88 of the magnetic flux 49, known herein as the proximity flux component 88, extends outside the physical extent of the magnetic circuit 38 and is sensed by the magnetic sensing element 50, which provides a second signal component 74 known herein as a proximity signal component 74 that is responsive thereto, or in other words, that is responsive to changes of the magnetic characteristics of a region proximate to the magnetic circuit 38.

Changes to the size, shape, position, construction integrity, spot-weld quantity and integrity, material correctness, and assembly alignment of the door 14; or to the magnetic environment proximate to the door 14, for example, by the presence of a ferromagnetic object such as another vehicle 90; affect the magnetic circuit 38, and thereby affect magnetic flux 49 sensed by the magnetic sensing element 50.

The door 14, or another part of the magnetic circuit 38 subject to surveillance, may be supplemented or modified by adding or relocating steel or other highly permeable material in the door 14 to as to modify the strength and/or shape of the respective first 86 and second 88 portions of the magnetic flux 49, thereby enhancing the associated magnetic circuit 38 so as to improve the respective bent metal 72 and/or proximity 74 signal components. This may further enable a reduction in power to at least one coil driver 58, thereby reducing associated radiated power from the at least one first coil 42. Moreover, this may enable a reduction in gain of the associated preamplifier/test circuit 68, which improves the associated signal-to-noise ratio. The magnetic flux 49 generally follows a path of least reluctance, which typically would correspond to sections of greatest amounts of magnetically permeable material. For a door 14 constructed of steel, this path would then correspond to one or more sections of the door 14 that contribute substantially to the strength of the door 14. Accordingly, the magnetic circuit 38 can be optimized with respect to magnetic performance, strength and cost by this supplementation or modification of the associated magnetically permeable material.

For example, the magnetic circuit 38 can be modified or augmented in various ways, including but not limited to the following, many of which provide for increasing the ratio of magnetic flux density per unit drive current and thereby increase the magnetic efficiency of the magnetic circuit 38:

1. Mu-metal, ferrite or some other magnetic conductor can be added to the door 14, for example to a plastic door 14, e.g. by coating the inside of the door 14 with a ferrite paint or coating to increase the permeability thereof, to augment or re-tune the door's natural magnetic characteristic;
2. Holes may be added to the door 14 or modified, thus shifting the magnetic conduction;
3. A supplemental ferrite or mu-metal flexible linkage may be added between the "A" pillar 16.1 and the door 14 for generating the magnetic flux 49, instead of the hinges 18;
4. Ferrite, an amorphous metal (e.g. METGLAS®), or mu-metal may be placed in the striker 22 and second coil 54, or generally added to or used as the core of either the first 42 or second 54 coil 42 to enhance the magnetic flux 49 therein, or to provide for operating at a lower current level for the same amount of magnetic flux 49;
5. A permanent magnet may be added to the door 14 to augment or re-tune the intrinsic permanent magnetic characteristic signal of the magnetic circuit 38;
6. The magnetic structure of the door 14 can be changed, for example by using a thinner metal skin, a plastic door skin, or ferrite rods to change the magnetic gain, so as to enhance proximity sensing for enhanced system safing responsive to the proximity flux component 88;
7. The hinge or striker shape, size, or material can be changed to improve their associated magnetic characteristics; and
8. The door side-guardrail assembly and construction, the hinge assembly, or the latch/lock mechanism/striker assembly can be changed to enhance system performance and sensitivity.

In addition to the herein described use in detecting a crash or an impending crash, the magnetic sensor 10 can also be used to monitor the structural integrity of structural elements of the magnetic circuit 38, particularly the structural integrity of the door 14, for example as a post manufacturing inspection of a door 14 either mounted to a vehicle 12, or separate therefrom in a magnetic circuit of an associated test apparatus. For example, a missing structural element, such as guard rail, or poor spot welds, would likely affect the reluctance of the door 14 and if so, could be detected prior to assembly. Stated another way, a steel door 14 that does not conduct magnetic flux 49 well would not likely have sufficient side-impact strength. Accordingly, the door 14 can be tested for proper magnetic integrity, which can be predictive of the performance of the magnetic sensor 10, and indicative of the ability of the door 14 to withstand impact and thereby protect an occupant therefrom.

The magnetic sensing element 50 is responsive to a superposition of the first 86 and second 88 portions of magnetic flux 49, and converts the composite of both portions to a voltage that is amplified by the preamplifier/test circuit 68, wherein the relative strengths of the associated bent metal 72 and proximity 74 signal components is in proportion to the associated relative strengths of the first 86 and second 88 portions of magnetic flux 49. The magnetic sensing element 50 may be Faraday shielded to reduce noise, wherein a Faraday shield would shield the magnetic sensing element 50, e.g. second coil 54, from stray electric fields so as to prevent or reduce noise in the signal therefrom. For a magnetic sensing element 50 comprising a second coil 54, for example around the striker 22, the second coil 54 may be also be parallel resonated to match the associated carrier frequency of the at least one first signal 44 so as to improve the associated signal-to-noise ratio. Parallel resonance of the second coil 54 provides for increasing the strength of the signal therefrom, and for increasing the sensitivity thereof to variations in the magnetic flux 49 in the magnetic circuit 38. Experiments have shown that locating the second coil 54 proximate to the end wall 92 of the door 14 enhances the awareness of the proximity flux component 88 of the magnetic flux 49. This suggests that the latch/lock mechanism 20—a localized thickening of the door metal—may act be as a magnetic lens to magnify the effect of the proximity flux component 88 at the second coil 54. The air gap 28 helps to create the proximity flux component 88, and the region of greatest sensitivity by the proximity flux component 88 to approaching objects is proximate to the air gap 28. Impacts to the door 14 tend to modulate the air gap 28, causing significant changes to the associated magnetic flux lines 84, thereby causing the magnetic sensing element 50 to generate an associated signal of significant magnitude. The signal responsive to the modulated air gap 28 provides a measure of instantaneous recoil velocity of the door 14, which may be used to detect door bounce events for which an associated safety restraint actuator 64 is typically not deployed. The magnetic sensor 10 can be responsive to movement of a latched door 14, More particularly, the door 14 acts as a rigid body at the beginning of a collision and is pushed inwards towards the body of the vehicle 12 against the compliance of the weatherseal surrounding the door 14, thereby exhibiting elastic behavior. The magnetic flux 49 sensed by the magnetic sensing element 50 changes responsive to the movement of the door 14, thereby enabling the lateral position and velocity of the door 14 to be measured from that change.

If the momentum of the impact is less than a threshold, for example for small objects or low impact velocities, the door 14 will then bottom out within a range of elastic behavior and rebound, thereby reversing the above described change to the magnetic flux 49 which is indicated by a shift in polarity of the signal from the magnetic sensing element 50. Accordingly, the detection of such a rebound event is indicative of an impact for which the safety restraint actuator 64 would not be necessary. Otherwise, if the momentum of the impact is greater than a threshold, then the door 14 becomes plastically deformed, resulting in a significant change to the bent metal signal component 72, which can be indicative of a need to subsequently deploy the safety restraint actuator 64. Accordingly, if after an initial movement of the door 14 is detected, either the door 14 fails to rebound and/or a significant bent metal signal component 72 is detected, then the impact might be considered to be sufficiently severe to warrant the deployment of the safety restraint actuator 64. Moreover, the initial velocity of the door 14 can be used as a predictor or indicator of impact severity.

A ferromagnetic door 14 is characterized by an associated natural permanent magnetic field which acts to generate a static magnetic flux 49 within the magnetic circuit 38 responsive to the reluctance of the magnetic circuit 38, changes to which as a result of door motion are sensed by the magnetic sensing element 50. This response—effectively an AC transformer transfer component—is superimposed upon the response to the at least one first signal 44, and can provide an independent measure of door motion and impact velocity.

Experiments have shown that responsive to an FMVSS-214 impact the door 14 can rotate about its centerline causing—at the beginning of the impact—an increase in the air gap 28 between the door 14 and the vehicle body at the top of the door 14. By comparison, experiments have shown that a pole-type impact causes a corresponding reduction in the air gap 28. Accordingly, the behavior of the air gap 28 responsive to a crash can be used to identify the type of crash. Accordingly both the type and severity of the crash can be detected by the magnetic sensor 10. Commencing with an impact, the door 14 is generally moves readily responsive to the crash until the latch/lock mechanism 20 bottoms out against the associated striker 22. Accordingly for a striking object that is relatively massive in comparison with the door 14, the velocity of impact can be measured by the magnetic sensor 10 from the motion of the door 14 prior to this "bottoming out" thereof. After the door 14 "bottoms out" against the vehicle body, the impact causes bending or deformation of the door 14, causing further changes to the magnetic circuit 38 that are sensed by the magnetic sensor 10, providing further information about the intensity and duration of the crash.

Another vehicle 90 proximate to the at least one first coil 42 attracts magnetic flux 49, thereby causing a third portion 94 of the magnetic flux 49 generated by the at least one first coil 42 to bypass the magnetic sensing element 50. Moreover, if the door 14 becomes dented or deformed, the distribution and/or strength of the magnetic flux 49 in the door 14 changes, which change is sensed either by the magnetic sensing element 50 or by a change in the load upon the at least one first signal 44 by the at least one first coil 42. Accordingly, substantially the entire door 14 acts a sensing element of the magnetic sensor 10, wherein the effect of changes to the magnetic characteristics thereof on the number and distribution of the magnetic flux lines 84 propagates at the speed of light from the location of the disturbance to either the at least one first coil 42 or the magnetic sensing element 50. Moreover, by placing the at least one first coil 42 on at least one hinge 18, and the second coil 54 on the striker 22, the door 14 becomes a sensing element without actually running any wires or signal cables into the door 14. The magnetic sensor 10 using the door 14 as a sensing element in a proximity sensing mode can be used to either monitor a blind spot of the vehicle 12 or to monitor traffic in an adjacent lane. The extent of coverage by the proximity mode can be increased by increasing the strength of the associated magnetic flux 49, e.g. by increasing the current supplied to the first coil 42, or by adapting the associated magnetic circuit 38 to increase the associated proximity flux component 88.

With substantially the entire door 14 as a sensor, the magnetic sensor 10 can sense incoming objects approximately of door dimension. Car bumpers and roadside poles similar to the door dimension, for which a safety restraint actuator 64 would be required in a crash, will generally be visible whereas basketball and other small objects, for which a safety restraint actuator 64 would not be required, would be less visible. A shopping cart loaded with groceries would also be visible to the magnetic sensor 10, however the decision of whether or not to deploy a safety restraint actuator 64 would be based upon more factors than just the visibility of a particular object. The magnetic sensor 10 is not responsive to impacts such as impacts to the undercarriage, for example from a rock, that do not affect the magnetic circuit 38, but which might otherwise affect an acceleration based crash sensor.

Accordingly, the magnetic sensor 10 is responsive to various physical effects upon the magnetic circuit 38, including but not limited to the following:

1) Changes to the air gap 28 of the magnetic circuit affecting the bent metal signal component 72.
2) Changes in the shape and density of the proximity flux component 88 proximate to the air gap 28 surrounding the door 14, including the front edge of the door 14 and front fender, the rear edge of door 14 and rear fender (or the rear door 14 of a four (4) door vehicle), the bottom of the door 14 to floor board, and, to a lesser extent, the top of the door 14 or window frame to the roof. The bent metal signal component 72 is responsive to deformations of the door 14 or adjacent body components that close, or short, the air gap 28.
3) The door 14, particularly the skin thereof, has a natural resonant frequency that can be excited by the at least one first coil 42 if driven at that frequency by the at least one first signal 44. An impact to the door 14 induces vibrations therein associated with the resonant frequency thereof, and with associated overtones. At this resonant frequency, if the vibrating elements of the door 14 become constrained as by contact with an impacting object, this causes a dampening of the resonance which increases the eddy current losses in the magnetic circuit 38, which can be measured by the bypass power processor 66 from the power supplied to the at least one first coil 42. Furthermore, the impacting object can influence the associated resonances, so that the nature of the resonances measured by the magnetic sensor 10 provides associated information about the nature of the impact—e.g. severity—or the nature of the impacting object. Stated in another way, the door 14 has a natural resonant behavior, but exhibits a forced response to the impact thereof by an impacting object because of the continued interaction of the impacting object with the door 14.
4) The structural elements of the door 14 typically provide a path of least reluctance for the associated magnetic flux 49, and mechanical stresses therein can alter the reluctance thereof, so that changes to the magnetic flux 49 can be related to the level of forces applied to the door 14 and to the structural elements thereof, which force levels can be related to the momentum or velocity of the impacting object. Accordingly, the measurements of the magnetic flux 49 provides a measure of threat to the door 14.

The bent metal 72 and proximity 74 signal components in the composite signal from the magnetic sensing element 50 are demodulated by the synchronous demodulator 70 and amplified by different respective gains of the associated bent metal 76 and proximity 80 processors, wherein the respective gains are for example in proportion to the relative permeance of the materials associated with the respective magnetic flux components. The bent metal 72 and proximity 74 signal components differ with respect to signal magnitude, and without further differentiation, only one of the two components would be useful at a given time. Prior to impact, the proximity signal component 74 provides information about a proximate object. However, after the occurrence of an impact, the proximity signal component 74 becomes relatively small, if not insubstantial, in comparison with the corresponding bent metal signal component 72. For example, the proximity signal component 74 might have a magnitude of 0.2 volts, which is about twenty five times smaller than the corresponding bent metal signal component 72 after impact, which might have a magnitude of 5.0 volts. For example, when the bent metal signal component 72 is of sufficient magnitude to indicate a physical disturbance of the magnetic circuit 38, then the proximity signal component 74 would be saturated. Otherwise, the bent metal signal component 72 would be of negligible magnitude and the proximity signal component 74 would be useful for detecting objects proximate to the door 14. This mutual exclusive utility of the respective signal components is consistent with the sequence of a crash, in that an impacting object becomes proximate to the vehicle 12 before impacting the door 14; and after the impact has occurred as indicated by the bent metal signal component 72, there would likely be little need to continue to detect the proximity signal component 74.

Given the bent metal 72 and proximity 74 signal components, the microprocessor 56 can monitor the total magnetic health of the door 14 and be aware of relatively large metal objects in proximity thereto. An example of one algorithm using this information to control a safety restraint actuator 64 would be to monitor the proximity signal component 74 to detect a relatively rapid approach of a relatively large metal object. When the proximity signal component 74 becomes saturated, indicating a likely perturbation to the physical magnetic circuit 38, then if the bent metal signal component 72 indicates a sufficiently large change, then it is assumed that a potentially injurious impact has occurred and the safety restraint actuator 64 would be actuated. Otherwise, if the proximity signal component 74 returns to a quiescent state without the occurrence of a significant bent metal signal component 72, then it is assumed that the door 14 has not been impacted, but instead, for example, another vehicle has passed by the door 14, and the safety restraint actuator 64 would not be actuated.

Both the power applied to the at least one first coil 42, and the gain and phase of the signal from the magnetic sensing element 50 in relation to the at least one first signal 44, are continuously monitored and stored in a memory 95 of a microprocessor 56 as a real-time magnetic signature of the door 14. In an embodiment of the magnetic sensor 10 responsive to relative phase, the phase of the signal from the magnetic sensing element 50 can be compared with that of the first signal 44 from the oscillator 46 with a phase detector 96 which outputs the associated phase difference to the microprocessor 56. The real-time magnetic signature is compared with at least one other comparable magnetic signature—for example at least one magnetic signature representing the door 14 prior to an impact or collision, i.e. a normal signature; or at least one magnetic signature representing various impacts or crashes—in order to determine if an associated safety restraint actuator 64 should be actuated. The at least one normal signature may include magnetic signatures that account for variations in the magnetic flux 49 as a result of either metal objects proximate to or approaching the door 14 or variations as a result of corrosion or variations in temperature. The normal signature may be updated over time so as to track minor perturbations of the door 14, such as due to temperature or corrosion, which changes would likely occur relatively slowly over time. If the real-time magnetic signature of the bent metal signal component 72 is sufficiently different from the normal magnetic signature, the microprocessor 56 would actuate the safety restraint actuator 64.

Accordingly, the magnetic sensor 10 is responsive to both small-signal and large-signal disturbances. Small-signal disturbances would include, for example, impacts by relatively small objects such as basketballs or other sporting projectiles, which typically do not cause plastic deformation of the door 14, but for which the door 14 and surrounding weatherseal respond elastically. Large-signal disturbances would include, for example, side impacts that causes plastic deformation of the door 14, thereby permanently shifting its magnetic signature. The magnetic sensor 10 detects the change in magnetic signature from the pre-impact undeformed condition to the post-impact deformed condition. Moreover, the plastically deformed metal is work hardened which causes a change to the permeance thereof, which is sensed by the magnetic sensor 10. At the beginning of the impact, prior to plastic deformation of the door 14, the magnetic sensor 10 is able to estimate the impact velocity and severity of the impact using principles of the physics of collisions including conservation of energy and momentum, whereby the response of the door 14 increases with increasing impact severity. The signal from the magnetic sensing element 50 comprises information about both the instantaneous position and the instantaneous velocity of the door 14. Moreover, particular polarities of the signal are indicative of particular motions of the door 14.

The magnetic sensor 10 provides a real-time validation of the health and integrity of the respective at least one first coil 42 and the second coil 54, by testing the respective coils for shorts or open conditions, or by using a separate sense coil 62 to detect the magnetic flux 49 generated by the at least one first coil 42. Moreover, the magnetic sensor 10 provides a continuous test of the integrity of the magnetic circuit 38, including the component under magnetic surveillance, for example the door 14.

Referring to FIG. 1, in first alternate embodiment of the magnetic sensor 10, the at least one first coil 42 comprises a plurality of first coils 42.1 and 42.2 at distinct first locations 48.1 and 48.2, for example operatively coupled to the top 18.1 and bottom 18.2 hinges that operatively couple the door 14 to the "A" pillar 16.1. The separate first coils 42.1 and 42.2 are driven by separate corresponding first signals 44.1 and 44.2, each having a distinct phase with respect to the other, so as to create a magnetic flux 49 that "rotates" while traveling through the door 14 to the magnetic sensing element 50, whereby an impact to the door 14 affects the trajectory of the separate signals, thereby affecting the relative distribution of the different phases in the signal sensed by the magnetic sensing element 50. The relative phase of the separate first signals 44.1 and 44.2 is controlled by a phase control circuit 98 between the oscillator 46 and one of the coil drivers 58, and which, for example, is under control of the microprocessor 56. The phase encoding of the respective first signals 44.1 and 44.2 is similar in theory to the phase encoding of color television and FM radio signals so as to increase the transfer of information along a channel with limited bandwidth. By separately encoding the separate first signals 44.1 and 44.2, these respective signals from the first coils 42.1 and 42.2—respectively around the top 18.1 and bottom 18.2 hinges—can be distinguished in the signal from the magnetic sensing element 50 so as to provide a measure of the vertical location of an impact to the door 14.

Referring to FIG. 3, in a second alternate embodiment of the magnetic sensor 10, the at least one first coil 42 comprises a first coil 42 at a first location 48 and a plurality of magnetic sensing elements 50, for example second coils 54.1 and 54.2 at respective distinct second locations 52.1 and 52.2 that are each distinct from the first location 48. For example, the first location 48 might be the bottom hinge 18.2 for improved signal-to-noise ratio, and the second locations 52.1 and 52.2 might be the striker 22 and the top hinge 18.1 respectively. Such an arrangement would exhibit enhanced sensitivity to impacts proximate to the bottom hinge 18.2.

The at least one first coil 42 or the at least one magnetic sensing element 50 can be located at a variety of locations and constructed in accordance with a variety of configurations, including but not limited to the following: one or more hinges; the striker; the side impact protection rail or beam inside the door 14; around or proximate to the latch/lock mechanism either inside or outside the door 14; inside the spot weld line on the top or bottom of the door 14; around or proximate to the hinge bolts; on the inner door skin of a plastic or steel door 14 with the perimeter of the coil nearly matching the perimeter of the door 14; around the window glass perimeter; around the entire door structure such as in the air gap surrounding the door 14 and the opening that one passes through when entering or exiting the vehicle; in a window such as the driver-side window, as a defroster; behind a plastic door handle or trim component, along with associated electronics; around the window glass opening in the door 14 through which the window is lowered; or in the plastic side view mirror housing for sensing over an extended range, for example to locate steel objects that might pose a side-impact threat.

The magnetic fields generated by these arrangements have a variety of principal orientations, including but not limited to longitudinal, transverse, and vertical. For example, a first coil 42 can be placed around a hinge 18 so that the associated magnetic field is either longitudinal or transverse, the former arrangement providing principally a bent metal flux component 86, whereas the later arrangement providing a relatively strong proximity flux component 88. As another example, a first coil 42 around the window glass opening in the door 14 through which the window is lowered generates a vertical magnetic field that circulates around the vehicle along a transverse section thereof. As yet another example, a first coil 42 around the door 14 or window in the plane thereof generates a transverse magnetic field that is useful for proximity sensing. Different first coils 42, at least one adapted to produce principally a bent metal flux component 86 and the other adapted to produce principally a proximity flux component 88 can be used with different associated first signals 44, for example, respective first signals with different oscillation frequencies, so as to provide distinguishable bent metal 72 and proximity 74 signal components in the signal from the magnetic sensing element 50, wherein the respective signals would be demodulated by respective synchronous demodulators 70. For example, in one embodiment, a 10 KHz first signal 44.1 is applied to a first coil 14.1 on the top hinge 18.1, and a 20 KHz first signal 44.2 is applied to a first coil 14.2 on the bottom hinge 18.2, and both frequencies are sensed substantially simultaneously by different associated magnetic sensing elements 50 associated with the B-pillar and C-pillar of the vehicle 12, respectively.

The operating point of the magnetic sensor 10, for example the level of magnetic flux 49 within the magnetic circuit 38 and the nominal current supplied to the at least one first coil 42, under quiescent conditions, can be adjusted by adjusting the wire gage or number of turns of at least one first coil 42.

The system safing or proximity detection can be enhanced by various means, including but not limited to placing a winding around the undercarriage, door opening, or hood of the automobile; placing a winding around the front fender of the automobile; placing a ferrite rod inside the hinge coil, or inside the striker coil for magnetic focusing; placing a ferrite rod coil in the gap or space between the doors; or placing a supplemental first coil 42 in the side-view mirror molding, which extends sidewards away from the vehicle. An additional system safing supplemental first coil 42, with proper phasing and with the magnetic circuit return properly adjusted, would substantially increase the system safing signal performance. For example, this coil could be about 3 inches in diameter and in a plane parallel to the door surface, or wound on a ferrite rod aligned to enhance the launch range and enhance the directivity for system safing. Moreover, by the combination of proximity detection and bent metal detection, together with a self-test of the associated at least one first coil 42 and the magnetic sensing element 50, the magnetic sensor 10 is able to provide both safing and crash detection functions, thereby precluding the need for a separate crash accelerometer. The coils 42, 54 and 62 of the magnetic sensor 10 could, for example, be constructed of wire wound on an associated bobbin, and then placed over an existing component of the vehicle, for example a hinge 18 or striker 22.

The coils or sensing elements may incorporate a ferrite or other high permeability magnetic core. Also, highly-tuned coils can be used for magnetic signal generation. Moreover, the width and length of coil bobbins can be adapted to steer the magnetic flux 49. Lastly, the at least one first coil 42 or the at least one magnetic sensing element 50 might incorporate ferrite rod coils placed under the vehicle chassis, in the vehicle headliner, in the "A" pillar, or in the "B" pillar, pointing towards the road.

Moreover, the signals associated with the magnetic sensor 10 can be generated, adapted or processed in a variety of ways, including but not limited to:

1. Setting up an alternate frequency to create system safing on the rear door 14 to enhance the system safing of the front door 14;
2. AM, FM or pulsed demodulation of the magnetic signature;
3. Multi-tone, multi-phase electronics;
4. A magnetically-biased, phase-shift oscillator for low-cost pure sin θ wave generation;
5. A coherent synthetic or phased-locked carrier hardware- or microprocessor-based system;
6. A system of microprocessor gain-or offset-tuning through D/A then A/D self-adjust or self-test algorithm;
7. Placing a "standard" in the system safing field for magnetic calibration;
8. Inaudible frequencies;
9. Microprocessor-generated crystal stabilized frequencies for stability, including microprocessor D/A converter for coherent sine-wave generation;
10. Wide-band system electronics;
11. Closed loop gain- and phase-control of the signal to a sending-coil (i.e. AGC with the door 14 acting as a delay line), wherein the gain- and phase-control signals are used as sensor outputs;
12. AC or DC operation, wherein the DC portion of the signal provides information from the net static magnetic flux 49 of the door 14 in product with the velocity of the impact, but does not provide proximity information, and the AC approach provides the proximity field and allows the system to be ratiometric with the known and stationary transmitter gain;
13. In accordance with experiments that have shown that the phase varies as the magnetic gain across the door 14 varies, a phase processor (FM) that has a lower signal-to-noise ratio than a gain processor (AM);
14. Monitoring the power delivered by the coil driver, particularly the bypass power, in order to detect impacts near or at the hinge(s) magnetically energized with the at least one first coil;
15. A series-resonant coil driver-circuit to increase current to flow to the at least one first coil 42 so as to improve the signal-to-noise ratio, wherein the associated current to the at least one first coil 42 is monitored to provide a continuous self-test of the at least one first coil 42, as well as a measure of the power drawn by the at least one first coil 42; and
16. Using another type of magnetic sensing element 50, for example a Hall effect or a Giant Magneto-resistive (GMR) device, instead of a second coil 54.

If both front doors are to be protected, then the effects of temperature and component variation may be mitigated by making a ratiometric measurement of comparable signals from one door 14 relative to another, wherein it is assumed that both doors will not be simultaneously impacted. The ratiometric measurement may also be used to augment the individual measurements from each door 14. Furthermore, a common oscillator may be used to generate a common signal used by each associated first coil 42, so as to reduce cost and to synchronize the magnetic flux 49 generated at various locations in the vehicle 12.

Whereas the magnetic sensor 10 has been illustrated herein with the door 14 as a principal sensing element, the magnetic sensor 10 may generally be adapted to sensing the integrity of any component capable of conducting magnetic flux 49, and would be advantageous for sensing large or long ferromagnetic parts. For example, the magnetic sensor 10 can be adapted to sensing other body parts, such as fenders, that are attached to the main body of the vehicle by operatively connecting an at least one first coil 42 between the body part and the main body at the point of attachment.

The proximity or leakage magnetic field comprising the above described second 88 and third portions 94 of the magnetic flux 49 can be useful for detecting magnetically permeable objects proximate to a vehicle 12, for example proximate to a door 14 of a vehicle 12; and for detecting the velocity of an object from the affect over time of the object on the permeance of the region proximate to the vehicle 12. This provides for what is termed herein a "radar mode" of operation useful for anticipatory collision sensing, with the following features:

1. The "radar mode" can be further augmented by the use of independent carrier frequencies. With frequency differentiation on the magnetic "transmitters" the system can determine and differentiate the incoming "magnetically visible" object's "height off of the earth" relative to the upper and lower hinge position. A SUV will send "more signal" to the upper hinge as compared with a low profile sports car.
2. The incoming object height information will also support pole versus 214 style-hit scenarios.
3. The "radar mode" provides for anticipatory crash sensing, adjacent lane awareness, blind spot awareness, a means for measuring a following distance to a preceding vehicle, a sensor for a collision avoidance system that, for example, could turn the steering wheel as the result of an object detected in the "magnetic fringing field of view" of the automobile door described above, and a sensor for use in a system to automatically center the vehicle between other vehicles in adjacent driving lanes.

4. Some quantity of the magnetic flux generated by the hinge coil will enter the space surrounding the automobile door and return from that space and enter the striker coil.
5. Permeable objects will be detectable as magnetic "leakage" flux lines from the door enter and exit the near-by-permeable object.
6. The list of permeable objects "visible" to the door magnetic fringe field includes, but is not limited to people or relatively large animals, metal objects, automobiles, any object of comparable size to the door and with a distinct permeance, living trees comprising a permeable material.
7. The incoming velocity of these objects can be measured.
8. A state machine can be used to track object motion history and "anticipate" a collision with an object having sufficient velocity to be a danger to the occupant if the velocity does not change. This pre-crash information is sometimes referred to as information at a "negative time".

Figure 4:
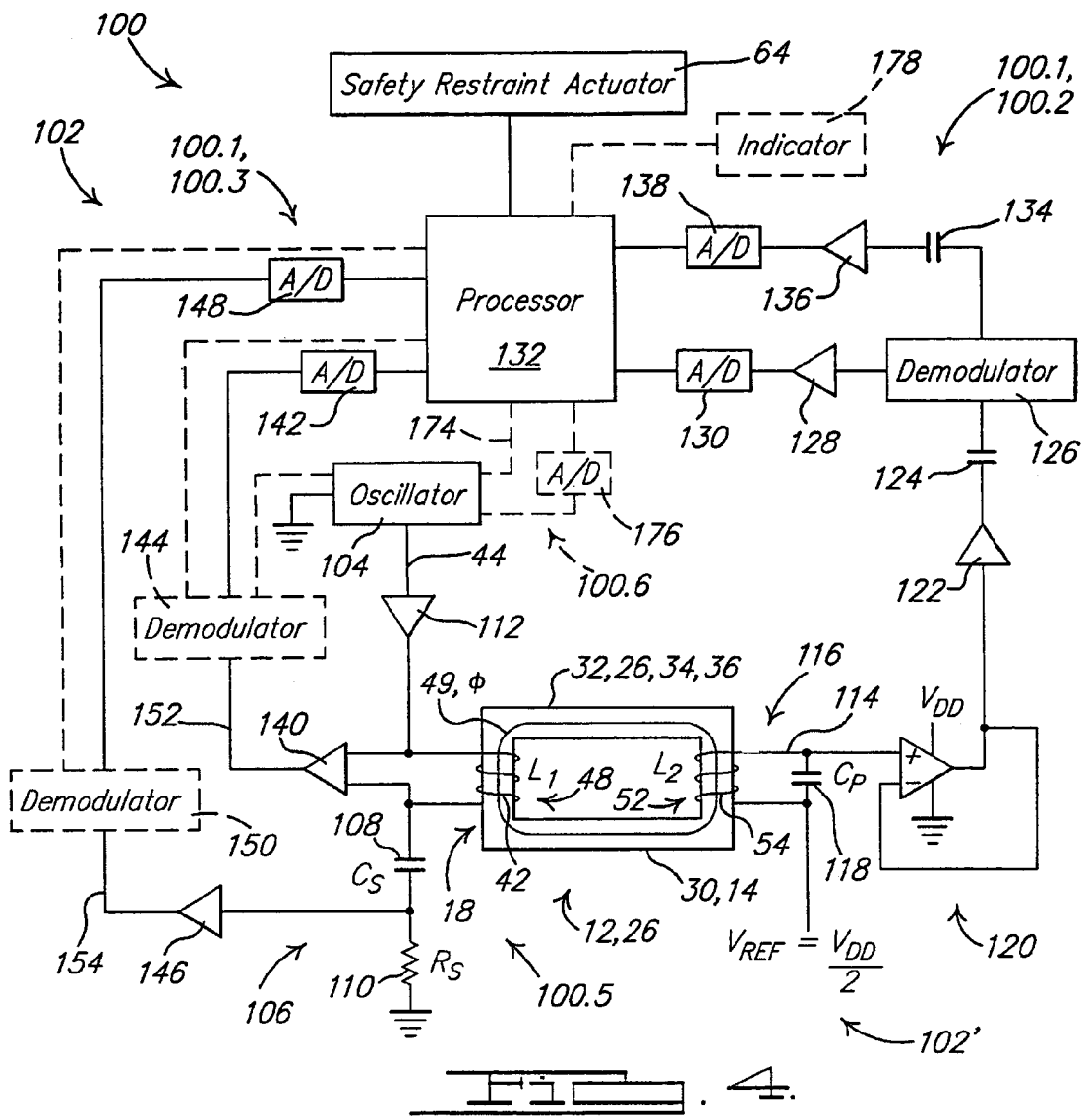
FIG. 4 illustrates a block diagram of several embodiments of a magnetic sensor incorporating first and second resonant circuits.

Referring to FIG. 4, a magnetic sensor 100 comprises a first coil 42 ($L_1$) operatively associated with a magnetic circuit 38 of a vehicle body 26—schematically illustrated, for example, comprising a first magnetic path 30 along a door 14 of the vehicle 12 and a second magnetic path 32—distinct from the first magnetic path 30—comprising the body 26, structure 34, or powertrain 36 of the vehicle 12, wherein the first 30 and second 32 magnetic paths together constitute a closed magnetic path 40. The first coil 42 ($L_1$) is operatively coupled to an electrical circuit 102 adapted so that the first coil 42 ($L_1$) in cooperation with the electrical circuit 102 exhibits a resonant or near-resonant condition in association an oscillatory first signal 44 applied by the electrical circuit 102 to the first coil 42 ($L_1$), which generates an associated time-varying magnetic flux 49, $\phi$, in the magnetic circuit 38. In the example illustrated in FIG. 4, the electrical circuit 102 comprises an oscillator 104 adapted to drive a first resonant circuit 106 comprising the first coil 42 ($L_1$), a first capacitor 108 ($C_S$) and a resistor 110 ($R_S$) in series with the first coil 42 ($L_1$), wherein the first signal 44 from the oscillator 104 is operatively coupled to the first coil 42 through a first buffer amplifier 112.

For example, the oscillator 104 may generate either a sinusoidal or square wave signal, which can be either mono-polar or bi-polar, although a mono-polar signal is beneficial in simplifying the associated circuitry of the electrical circuit 102 and it associated power supply. In one embodiment, the oscillator 104 is adapted to oscillate at 20 KHz and the associated first resonant circuit 106 is adapted to have an associated resonant frequency of 10 to 20 KHz. The associated electrical circuit 102 is adapted to operate at about half the nominal voltage of the associated power supply of the associated electrical circuit 102, so as to provide for continuous operation over the expected operating cycle of the power supply, e.g. vehicle battery. Accordingly, for a a nominal 12 volt power supply, this oscillator 104 generates a mono-polar signal of 0–6 volts. Generally, the nominal oscillation frequency of the oscillator 104 may range between DC (no oscillation) and 100 KHz for a typical vehicle 12, but which may be 1 MHz or higher in a vehicle that has been augmented with supplemental magnetic materials such as mu-metal, ferrite or amorphous metal materials (e.g. METGLAS®). For example, in one set of embodiments, the oscillation frequency of the oscillator 104 is adapted for the audio to near ultrasonic range of between 5 KHz and 30 KHz. The choice of a particular frequency can be affected by electromagnetic compatibility (EMC) issues associated with the magnetic sensor 100 in the vehicle 12, for example, so as to avoid interference with other electronic systems in the vehicle, e.g. the AM radio receiver. In one approach, the frequency spectra of the one or more signals responsive to the magnetic flux 49, $\phi$ are measured responsive to a crash and analyzed so as to determine an upper bound on the frequencies of relevance to the crash for subsequent processing. Then, the associated oscillation frequency of the oscillator 104 is adapted to be some factor greater than that upper bound frequency of the measured data, e.g. in accordance with the Nyquist criteria. For example, in one embodiment, the oscillation frequency may be adapted to be a factor of at least two times greater than the maximum frequency of interest, for example, a factor of 2.5. The associated nominal resonant frequency of the first resonant circuit 106 is adapted to be either the same as or different from the oscillation frequency of the oscillator 104, depending upon the particular embodiment. The voltage level of the oscillator 104 and the resistance of the first resonant circuit 106 are adjusted to provide the level of current through the first coil 42 ($L_1$) necessary to provide a desired level of magnetic flux 49, $\phi$ in the associated magnetic circuit 38. For a given level of current through the first coil 42 ($L_1$), an increase in the number of turns thereof increases the density of magnetic flux 49, $\phi$ thereby increasing the signal-to-noise ratio of the associated response signals.

Figure 5:
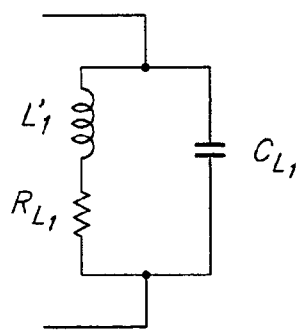
FIG. 5 illustrates a schematic diagram of a first coil incorporated in a magnetic sensor.

Referring to FIG. 5, the first coil 42 ($L_1$) can be modeled as an ideal inductor $L_1'$ in series with an ideal resistor $R_{L1}$ representing the electrical resistance in the wire of the first coil 42 ($L_1$), the series combination of which is in parallel with an ideal capacitor $C_{L1}$ representing the inter-turn capacitance of the first coil 42 ($L_1$). The oscillation frequency $f_0$ of the oscillator 104 and the capacitance of the first capacitor 108 ($C_S$) are adapted so that the series combination of the first coil 42 ($L_1$) and the first capacitor 108 ($C_S$) exhibits a resonant or near-resonant condition for at least one condition of the vehicle body 26. The inductance $L_1'$ of the first coil 42 ($L_1$) is responsive to the associated coil geometry and to the reluctance of the associated magnetic circuit 38, both of which can be responsive to a crash. For example, a crash involving the location of the first coil 42 ($L_1$) could distort the coil and possibly cause one or more turns of the coil to become shorted, which would affect the effective inductance $L_1'$, resistance $R_{L1}$ and capacitance $C_{L1}$ of the first coil 42 ($L_1$). Furthermore, a crash affecting elements of the magnetic circuit 38 can affect the reluctance thereof, which affects the inductance of the first coil 42 ($L_1$) magnetically coupled thereto in accordance with the relationship $L_1' = N^2/\mathcal{R}$, wherein $L_1'$ is the self-inductance of the first coil 42 ($L_1$), N is the number of turns of the first coil 42 ($L_1$), and $\mathcal{R}$ is the magnetic reluctance of the flux path, i.e. the magnetic circuit 38, to which the first coil 42 ($L_1$) is magnetically coupled.

A frequency domain representation of the current through a series combination of an inductor L, capacitor C and resistor R, responsive to a source voltage $V(j\omega)$ having an oscillatory radian frequency $\omega$ is given by:

$$I(j\omega) = \frac{-j \cdot \omega \cdot V(j\omega)}{L \cdot \left(\omega^2 - \frac{R}{L} \cdot j\omega - \frac{1}{LC}\right)} \quad (1)$$

and the voltage $V_L$ across the inductor L is given by:

$$V_L(j\omega) = \frac{\omega^2 \cdot V(j\omega)}{\omega^2 - \frac{R}{L} \cdot j\omega - \frac{1}{LC}} = \frac{V(j\omega)}{1 - j \cdot 2 \cdot \zeta \cdot \frac{\omega_n}{\omega} - \left(\frac{\omega_n}{\omega}\right)^2} \quad (2)$$

wherein the resonant frequency $\omega_n$ and damping ratio $\zeta$ are defined respectively as $$\omega_n = \frac{1}{\sqrt{LC}} = \frac{1}{2\pi f_n} \text{ and } \zeta = \frac{\sqrt{\left(\frac{R}{L}\right) \cdot (R \cdot C)}}{2} \quad (3)$$

and $\omega_n$ and $f_n$ are the radian and natural resonant frequencies respectively. For a component of the oscillatory first signal 44 at the resonant frequency, i.e. at resonance, the inductive and capacitive reactances of the inductor L and capacitor C respectively, i.e. $j\omega L$ and $$\frac{1}{j\omega C}$$

respectively, cancel one another, resulting in an impedance Z=R of the series combination. At resonance, current I through the inductor L has a value of I=V/R, and the voltage $V_L$ across the inductor L is given by:

$$V_L(j\omega_n) = \frac{V(j\omega_n)}{-j \cdot 2 \cdot \zeta} = j \cdot \frac{V(j\omega_n)}{2 \cdot \zeta} \quad (4)$$

Figure 6:
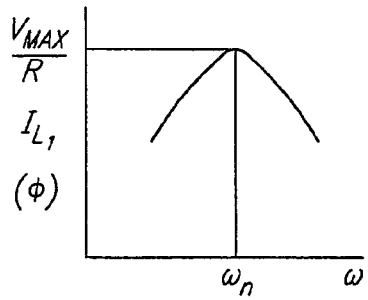
FIG. 6 illustrates a resonant behavior of a first resonant circuit.

Accordingly, referring to FIG. 6, for the first resonant circuit 106 illustrated in FIG. 4, the magnitude of the current $I_{L1}$ through the first coil 42 ($L_1$), and the corresponding magnitude of the magnetic flux 49, $\phi$, induced thereby in the magnetic circuit 38 is maximized when the first signal 44 from the oscillator 104 is at the resonant frequency $f_n=2\pi\omega_n$ of the first resonant circuit 106. For a given level of the first signal 44, this series resonant condition maximizes the magnitude of the magnetic flux 49, $\phi$, which provides for maximizing both the magnitude and signal-to-noise ratio of a crash related response thereto. In addition to providing for an improved signal-to-noise ratio of the response signal, the series resonant condition provides for accommodating lower levels of the first signal 44 than would otherwise be possible. For example, the level of the first signal 44 could be one volt, or less, if necessary.

Stated in another way, for a given magnetic flux 49, $\phi$, to be generated in the magnetic circuit 38 by the first coil 42 ($L_1$) responsive to a first signal 44, the necessary magnitude of the first signal 44 is lower for a series resonant condition than for a non-resonant condition. This is beneficial in an automotive environment—wherein the battery voltage is subject to substantial variation during its life cycle, depending upon the state of charge, the load levels, and the operativeness of the associated charging system—by providing for operation using a single-ended nominal 12 volt battery power supply to the electrical circuit 102 without requiring either an associated voltage magnification circuit or a bi-polar power supply circuit. For example, the series resonant condition provides for operating at a voltage substantially less than the nominal battery voltage—e.g. operating at about 6 volts for a 12 volt nominal battery voltage—so as to provide for uninterrupted sensing during conditions of low battery voltage. This reduces the complexity and cost of the power supply for the associated electrical circuit 102, and reduces associated power consumption by the components thereof. Operation at or near resonance is also beneficial in improving the electromagnetic compatibility (EMC) of the magnetic sensor 100 with other systems.

In one embodiment, the resistance $R_S$ of the resistor 110 ($R_S$) is lower than the resistance $R_{L1}$ of the first coil 42 ($L_1$) so as to reduce power consumption by the resistor 110 ($R_S$) and so as to increase the sensitivity of the current in the first resonant circuit 106 to changes in the resistance $R_{L1}$ of the first coil 42 ($L_1$). At resonance, the inductive reactance of the first coil 42 ($L_1$) cancels the capacitive reactance of the first capacitor 108 ($C_S$), so that the component of current in the first resonant circuit 106 at the resonant frequency is given by the ratio of the source voltage—i.e. the voltage of the first signal 44 from the oscillator 104—divided by the total resistance of the first resonant circuit 106—i.e. the sum of the resistance $R_{L1}$ of the first coil 42 ($L_1$), the resistance $R_S$ of the series resistor 110 ($R_S$), and the resistance of other associated conductors in the first resonant circuit 106, e.g. coil leads, cables, printed circuitry, and connector(s). The level of the maximum current level at resonance in the first resonant circuit 106 can be set to a desired level by adjusting either the total series resistance thereof or the magnitude of the first signal 44, or by adjusting both. The magnitude of the associated magnetic flux 49, $\phi$ generated by the first coil 42 ($L_1$) is proportional to the product of the number of turns N of the first coil 42 ($L_1$) times the current I therein, wherein the current I is given by the ratio of the level V of the first signal 44 divided by the total resistance of the first resonant circuit 106, or $$\phi \sim N \cdot I = \frac{N \cdot V}{R_{Total}} \quad (5)$$

For example, the maximum current I or associated maximum magnetic flux 49, $\phi$ may be adjusted to satisfy EMC requirements—e.g. on radiated power—by adjusting either the number of turns N or the total resistance $R_{Total}$ without impacting the associated operating voltage V of the system, which, for example, may be a mono-polar +6 volts for a nominal 12 volt battery powered system.

The self-capacitance $C_{L1}$ of the first coil 42 ($L_1$)—which increases with increasing number of turns N of the first coil 42 ($L_1$),—in combination with the self-inductance $L_1'$ of the first coil 42 ($L_1$), provides for inherent low-pass filtering of signals applied to or affecting the first coil 42 ($L_1$). For example, the first signal 44 from a square wave oscillator 104, e.g. a TTL (Transistor Transistor Logic) oscillator, would exhibit harmonics of higher frequency than the fundamental oscillation frequency $f_0$. These harmonics can be attenuated by this effective low-pass filter so as to reduce, or effectively preclude, the generation of components of magnetic flux 49, φ at the harmonic frequencies—which if otherwise generated might cause undesirable electromagnetic signals—thereby improving the electromagnetic compatibility (EMC) of the associated magnetic sensor 100. Furthermore, increased self-capacitance reduces the electromagnetic susceptibility of the magnetic sensor 100 to external interference.

In accordance with a first embodiment of the magnetic sensor 100.1—in what is referred to as a transformer mode of operation—the magnetic flux 49, φ generated in the magnetic circuit 38 by the first coil 42 located at a first location 48 on the magnetic circuit 38, responsive to the first signal 44 applied thereto, is sensed by a magnetic sensing element 50, e.g. a second coil 54 ($L_2$), at a second location 52 on the magnetic circuit 38, which generates a second signal 114 responsive to the reluctance of the magnetic circuit 38, for example, responsive to a crash affecting at least one element of the magnetic circuit 38, or responsive to a magnetic-flux-influencing object proximate to a proximity flux component 88 of the magnetic flux 49 of the magnetic circuit 38. The magnetic sensor 100.1 can be adapted so as to provide for sensing either the magnitude of the second signal 114 or components thereof, e.g. DC or AC, or for sensing the phase of the second signal 114 in relation to that of the associated first signal 44. For example, in one embodiment that operates at a relatively low frequency, the relative phase between the first 44 and second 114 signals might be used as a the primary measure to detect a crash.

Referring to FIG. 4, in accordance with a second embodiment of the magnetic sensor 100.2, the voltage level and the signal-to-noise ratio of the second signal 114 can be enhanced by incorporating a second resonant circuit 116 comprising a second capacitor 118 ($C_P$) in parallel with the second coil 54 ($L_2$), adapted to exhibit a resonant or near-resonant condition in combination therewith responsive to an oscillatory magnetic flux 49 generated responsive to the oscillatory first signal 44. The signal from the second resonant circuit 116 is biased with a DC offset $V_{REF}$ equal to about half the value of the voltage $V_{DD}$ of the associated power supply of the associated electrical circuit 102', so as to provide for a mono-polar second signal 114 from the second resonant circuit 116, thereby simplifying the associated circuitry and power supply requirements. The voltage across the parallel combination of the second coil 54 ($L_2$) and the second capacitor 118 ($C_P$) is input to a second buffer amplifier 120, the output of which is AC coupled through a first amplifier 122 and a first coupling capacitor 124 to a first demodulator 126, e.g. a synchronous demodulator, which detects the modulated amplitude of the carrier signal underlying the second signal 114. The output from the first demodulator 126 is directly coupled to a second amplifier 128, the output of which is coupled through a first analog-to-digital converter 130—e.g. as a bent metal signal component 72 of the second signal 114—to a processor 132 for processing as described hereinabove. The output from the first demodulator 126 is AC coupled through a second coupling capacitor 134 to a third amplifier 136, the output of which is coupled through a second analog-to-digital converter 138—e.g. as a proximity signal component 74 of the second signal 114—to the processor 132 for processing as described hereinabove.

Referring to FIG. 7, the second coil 54 ($L_2$) can be modeled as an ideal inductor $L_2'$ in series with an ideal resistor $R_{L2}$ representing the electrical resistance of the wire of the second coil 54 ($L_2$), the series combination of which is in parallel with an ideal capacitor $C_{L2}$ representing the inter-turn capacitance of the second coil 54 ($L_2$). The oscillatory magnetic flux 49, φ linked with the second coil 54 ($L_2$) induces a voltage therein in accordance with Faraday's law of induction, and this induced voltage is represented in FIG. 7 by an oscillatory voltage source $E_2$ in series with the associated ideal inductor $L_2'$. Although the second capacitor 118 ($C_P$) is connected in parallel with the second coil 54 ($L_2$), for purposes of modeling the associated second signal 114, the second capacitor 118 ($C_P$) and the second coil 54 ($L_2$) can also be considered to be connected in series since these are the only two elements connected to one another. More particularly, as illustrated in FIG. 7, the combination of the second coil 54 ($L_2$) and the second capacitor 118 ($C_P$) can be modeled as an ideal inductor $L_2'$ in series with an ideal resistor $R_{L2}$, an oscillatory voltage source $E_2$, and with a total capacitance $C_{P\_Total}$ given by the sum of the capacitances of the ideal capacitor $C_{L2}$ and the second capacitor 118 ($C_P$), i.e. $C_{P\_Total}=C_{L2}+C_P$. The associated second resonant frequency $f_{n\_2}$ of the second resonant circuit 116 is given by:

$$\omega_{n\_2} = \frac{1}{\sqrt{L_2' C_{P\_Total}}} = \frac{1}{2\pi f_{n\_2}} \quad (6)$$

The capacitance of the second capacitor 118 ($C_P$) and the inductance $L_2'$ of the second coil 54 ($L_2$) are adapted, for example, to set the second resonant frequency $f_{n\_2}$ to correspond to the oscillation frequency $f_0$ of the oscillator 104. The inductance $L_2'$ of the second coil 54 ($L_2$) is responsive to the associated coil geometry and to the reluctance $\mathcal{R}$ of the associated magnetic circuit 38, either of which can be responsive to a crash. For example, a crash involving the location of the second coil 54 ($L_2$) could distort the second coil 54 ($L_2$) and possible cause one or more turns thereof to become shorted, which would affect the effective inductance $L_2'$, resistance $R_{L2}$ and capacitance $C_{L2}$ thereof. Furthermore, a crash affecting elements of the magnetic circuit 38 can affect the reluctance $\mathcal{R}$ thereof, which affects the inductance of the second coil 54 ($L_2$) operatively associated therewith, in accordance with the relationship $L_2'=N_2^2/\mathcal{R}$, wherein $L_2'$ is the self-inductance of the second coil 54 ($L_2$), $N_2$ is the number of turns of the second coil 54 ($L_2$), and $\mathcal{R}$ is the magnetic reluctance $\mathcal{R}$ of the flux path, i.e. magnetic circuit 38, to which the second coil 54 ($L_2$) is coupled. Furthermore, the sensitivity of a change in inductance $L_2'$ to a change in reluctance $\mathcal{R}$ increases with an increasing number of turns $N_2$. At resonance, i.e. wherein the magnetic flux 49, φ oscillates at the second resonant frequency $f_{n\_2}$, the current through the second coil 54 ($L_2$) and the second capacitor 118 ($C_P$) is maximized to a level that is responsive to the associated series resistance of the second resonant circuit 116; and the second signal 114 ($V_{OUT}$)—given by the voltage across the second capacitor 118 ($C_P$)—is also thereby maximized, as illustrated in FIG. 8. The impedance of the parallel elements of the second resonant circuit 116 is relatively high at resonance, and this high impedance is buffered by the second buffer amplifier 120 (i.e. a voltage follower) shown in FIG. 4, so as to reduce loading thereof by the AC coupled first demodulator 126.

The parallel combination of the second coil 54 ($L_2$) and the second capacitor 118 ($C_P$) is beneficial for improving electromagnetic compatibility (EMC) by reducing susceptibility to externally generated electromagnetic fields, wherein at the associated relatively high frequencies, the impedance of the second capacitor 118 ($C_P$) is relatively low, thereby limiting the associated signal levels that can be generated thereacross. Accordingly, the second resonant circuit 116 provides for enhancing or maximizing the level of the second signal 114 for signals of interest, and for attenuating undesirable signals associated with electromagnetic noise.

It should be understood that the first and second embodiments of the magnetic sensor 100 can be practiced either jointly in combination with one another, as illustrated in FIG. 4, or individually—one or the other. In one mode of operation, the first and second embodiments of the magnetic sensor 100 provide distributed crash sensing, wherein the inductance of the first 42 ($L_1$) and second 54 ($L_2$) coils, and the mutual inductance therebetween, is responsive to a crash-induced deflection or deformation of the elements of the associated magnetic circuit 38, or responsive to magnetic-field-influencing objects proximate thereto, which thereby affects the magnetic flux 49, ϕ therein generated responsive to the first signal 44 applied to the first coil 42 ($L_1$) at the first location 48, and which affects the second signal 114 generated by the magnetic sensing element 50, e.g. second coil 54 ($L_2$), responsive to the magnetic flux 49, ϕ thereat. In another mode of operation, referred to as a safing mode, the first and second embodiments of the magnetic sensor 100 provide for a nominal level of the second signal 114 for a nominal state of the magnetic circuit 38, and changes of the second signal 114 therefrom provide an indication of changes of or to the elements of the magnetic circuit 38, e.g. the first coil 42 ($L_1$), the first 30 or second 32 magnetic paths, or the magnetic sensing element 50/second coil 54 ($L_2$). Accordingly, the second signal 114 can be compared with a threshold to determine whether the associated magnetic sensor 100.1, 100.2 is in an acceptable nominal state prior to the subsequent detection of a crash.

In accordance with a third embodiment of the magnetic sensor 100.3, the electrical circuit 102 associated with the first coil 42 ($L_1$) is adapted to sense one or more variables associated with the first resonant circuit 106, for example, the voltage across the first coil 42 ($L_1$), the current through the first coil 42 ($L_1$) as measured by the voltage across the resistor 110 ($R_S$) in series with the first coil 42 ($L_1$), or the voltage across the first capacitor 108 ($C_S$); so as to provide for determining therefrom a measure responsive to the inductance or resistance of the first coil 42 ($L_1$), for example, the inductance $L_1'$ of the first coil 42 ($L_1$), the magnitude of the voltage across the first coil 42 ($L_1$), the magnitude of the current through the first coil 42 ($L_1$), the phase angle between the voltage across the first coil 42 ($L_1$) and the current through the first coil 42 ($L_1$), the reactive power applied to the first coil 42 ($L_1$), or the real power that is absorbed by the first coil 42 ($L_1$). The measure responsive to the inductance or resistance of the first coil 42 ($L_1$) may then be used to either diagnose the operativeness of the first resonant circuit 106—particularly the first coil 42 ($L_1$)—or to detect the occurrence of a crash in accordance with a self-inductance mode of operation —particularly impacts proximate to the first location 48, (e.g. the hinge 18 side of the door 14) of the first coil 42 ($L_1$),—for example, in accordance with the teachings of U.S. application Ser. No. 09/648,606 filed on Aug. 26, 2000, now U.S. Pat. No. 6,587,048, which is incorporated herein by reference. For example, the current in the first coil 42 ($L_1$) can be sensed and compared with one or more thresholds to determine if the first resonant circuit 106 is operating normally for a nominal condition of the vehicle 12, or, for example, if one or more turns of the first coil 42 ($L_1$) are shorted. An impact to the vehicle 12 affecting the magnetic circuit 28 would modulate the voltage across, the current through, or the inductance of the first coil 42 ($L_1$) to which the above-identified measures are responsive. The measure responsive to the inductance or resistance of the first coil 42 ($L_1$) can be detected and sensed in real time so as to provide for real time detection of the operativeness of the first resonant circuit 106, e.g. so as to determine whether or not the first coil 42 ($L_1$) is generating a magnetic flux 49, ϕ in the magnetic circuit 38. Furthermore, different magnetic sensors 100 at different locations in the vehicle 12, e.g. the A-pillar, B-pillar or C-pillar of the vehicle 12 may be adapted to verify the operativeness of one another, and thereby provide for mutual safing of different magnetic sensors 100.

The current I in the first coil 42 ($L_1$) generates a magnetic flux 49, ϕ in the associated magnetic circuit 38. This magnetic flux 49, ϕ stores an associated energy therein which is in balance with both the energy transferred thereto by the first coil 42 ($L_1$), and with associated energy losses, e.g. resulting from either eddy currents, hysteresis or radiation. A mechanical perturbation of one or more elements of the magnetic circuit 38, e.g. the door 14, affects this energy balance, resulting in a corresponding affect on the current I received or absorbed by the first coil 42 ($L_1$), and it is believed that the magnitude of this affect is related to the mechanical energy associated with the associated mechanical perturbation.

Stated in another way, the inductance $L_1'$ of the first coil 42 ($L_1$) is responsive to the associated coil geometry (including wire size, number of turns, and turn shape and radii) and to the reluctance of the associated magnetic circuit 38. Accordingly, a change to either the magnetic circuit 38, or the to coil geometry,—e.g. responsive to a crash—will cause an associated change in the associated inductance $L_1'$ of the first coil 42 ($L_1$), which in turn causes an associated change in the impedance $Z_L$ thereof responsive to an oscillatory signal from the oscillator 104, which in turn causes an associated change in the impedance Z of the first resonant circuit 106 to which the first signal 44 from the oscillator 104 is applied. Accordingly, for a first signal 44 having a constant amplitude V, the resulting current I through the first coil 42 ($L_1$) given as I=V/Z will vary responsive to the value of Z, which is responsive to and indicative of the mechanical perturbation of either the associated magnetic circuit 38 or the first coil 42 ($L_1$).

Furthermore, for certain types of crashes, e.g. pole impacts, the extent to which a crash induced perturbation of the magnetic circuit 38 influences the resulting current I in the first coil 42 ($L_1$) is responsive to the proximity of the crash location to the first coil 42 ($L_1$). Accordingly, in accordance with one embodiment, the magnitude of the variation in current I in the first coil 42 ($L_1$) can be used as a measure of the proximity of the crash to the first coil 42 ($L_1$). In accordance with another embodiment, the variation in current I in the first coil 42 ($L_1$) in relation to the variation in the associated signal from one or more associated magnetic sensing elements 50 can be used to determine the location of the crash in relation to the locations of the first coil 42 ($L_1$) and the one or more associated magnetic sensing elements 50. Generally, the modulation of the current I in the first coil 42 ($L_1$) is useful for sensing crash severity and location, and for verifying the operativeness of the first coil 42 ($L_1$). By relatively increasing or maximizing the current I in the first coil 42 ($L_1$) using a first resonant circuit 106 as described hereinabove, the associated detection sensitivity is relatively increased or maximized.

Referring to FIG. 4, in accordance with a first embodiment of a subsystem for sensing one or more variables associated with the first resonant circuit 106, both the voltage across the first coil 42 ($L_1$), and the voltage across the resistor 110 ($R_S$), are sensed, the latter of which provides a measure of the current I through the first coil 42 ($L_1$). The voltage across the first coil 42 ($L_1$) is input to a differential amplifier 140 operatively coupled to third analog-to-digital converter 142, either directly or through a second demodulator 144, and the output of the third analog-to-digital converter 142 is input to the processor 132. The voltage $V_{RS}$ across the resistor 110 ($R_S$) is input to a fourth amplifier 146 operatively coupled to fourth analog-to-digital converter 148, either directly or through a third demodulator 150, and the output of the fourth analog-to-digital converter 148 is input to the processor 132. Notwithstanding that the fourth amplifier 146 is illustrated as a single-ended amplifier, it should be understood that the fourth amplifier 146 may also be adapted as a differential amplifier, with the differential inputs thereof adapted to measure the voltage signal across the resistor 110 ($R_S$).

It should be understood, that the analog-to-digital converters 130, 138, 144 and 148 would cooperate with associated low pass anti-aliasing filters either incorporated therein, or incorporated in other signal conditioning elements that preprocess the signal(s) thereto, so as to prevent high frequency information from aliasing as corresponding lower frequency information in the sampled signals. For example, in accordance with the Nyquist sampling criteria, the sampling frequency of the analog-to-digital converters 130, 138, 144 and 148 would be at least twice as great as the cut-off frequency of the associated anti-aliasing filter. It is beneficial to adapt the anti-aliasing filter, for example, by using a single pole anti-aliasing filter, so as to provide for avoiding excessive phase shift or delay in the filtered signal, so as to provide for an associated relatively fast step response.

The second 144 and third 150 demodulators, if present, provide for detecting one or more of the magnitude, the phase and the relative phase of the respective input signals to the respective demodulators 144, 150. More particularly, each respective input signal comprises a carrier at the oscillation frequency $f_0$, which carrier is modulated by a respective modulation signal, and the demodulators 144, 150, if present, provide for generating one or measures of amplitude or phase responsive to associated characteristics of the respective is modulation signal. Depending upon their configuration, the second 144 and third 150 demodulators, if present, may be connected either directly to the processor 132, e.g. to one or more digital inputs, or through associated third 142 and fourth 148 analog-to-digital converters. Furthermore, the functions of the second 144 and third 150 demodulators could be combined in a single demodulator that generates either analog or digital output signals, or both, and which is appropriately connected to the processor 132. Yet further, one or more demodulation functions could also be carried out directly by the processor 132 on one or more of the respective input signals. Yet further, one or all of the demodulators 126, 144 or 150 (e.g. the second demodulator 144 as illustrated in FIG. 4) may be operatively coupled to the oscillator 104 so as to facilitate phase processing of the associated signal(s). For example, the relative phase of the current through and voltage across the first coil 42 ($L_1$) can be affected by either the opening of the door 14, or an impact thereto resulting from a crash.

The voltage $V_{RS}$ across the resistor 110 ($R_S$) provides a measure of the current I therethrough, given by $I = V_{RS}/R_S$, which is also a measure of the current through the first coil 42 ($L_1$) in series therewith. The measure of current I will be responsive to the total resistance $R_{Total}$ of the first resonant circuit 106 and to the sum of the inductive and capacitive reactances of the first coil 42 ($L_1$) and the first capacitor 108 ($C_S$) respectively, the latter of which sum to zero at resonance. Increasing the gain of the fourth amplifier 146 increases the sensitivity of the measure of current I to the resistance $R_{L1}$ of the first coil 42 ($L_1$), and accordingly, the sensitivity to detecting whether one or more turns thereof are shorted. A shorting of one or more coils of the first coil 42 ($L_1$) causes the associated current I to increase. Furthermore, if one or more turns of the first coil 42 ($L_1$) are shorted, then the self-inductance $L_1'$ of the first coil 42 ($L_1$) would also be affected, e.g. reduced, which would in turn affect the current I and the associated measure thereof, and the total reactance of the first resonant circuit 106 would become increasingly capacitive reactive, thereby affecting the phase of the current I through the resistor 110 ($R_S$) relative to the voltage of the first signal 44 applied by the oscillator 104. The self-inductance $L_1'$ of the first coil 42 ($L_1$) is also responsive to the reluctance $\mathcal{R}$ of the associated magnetic circuit 38, changes to which—e.g. responsive to a crash or a proximate object—also affect the current I and the associated measure thereof. It is expected that the sensitivity of the self-inductance $L_1'$ of the first coil 42 ($L_1$) to changes in the reluctance $\mathcal{R}$ of the associated magnetic circuit 38 can be increased by increasing the number of turns of the first coil 42 ($L_1$). Additional fourth amplifiers 146 and associated electronics may be added to provide for a plurality of current responsive signals, each having a different level of associated amplifier gain and resulting sensitivity. For example, a different sensitivity might be used for detecting changes of resistance $R_{L1}$—e.g. caused by shorted turn condition—of the first coil 42 ($L_1$) than might be used for detecting crash-induced changes to the inductance $L_1'$ thereof. Alternately, a single gain-controllable fourth amplifier 146 could be used, with the gain thereof controlled by the processor 132.

For a pure inductor L, the relationship between the voltage $V_L$ across to the current $I_L$ through the inductor L is given by:

$$V_L = L \cdot \frac{dI_L}{dt} \text{ or, in the frequency domain,} \quad (7)$$

$$V_L(j\omega) = j\omega \cdot L \cdot I(j\omega)$$

$$V_L(j\omega) = j\omega \cdot L \cdot I(j\omega) \quad (7)$$

Accordingly, for an ideal inductor, the current I therethrough lags the voltage $V_L$ thereacross by 90 degrees, and in the frequency domain, the inductance is given by:

$$L = \frac{V_L(j\omega)}{j\omega \cdot I(j\omega)} \quad (8)$$

Alternately, in the time domain:

$$L = \frac{\int_0^{t_1} V_L(t) \cdot dt}{I_L(t_1) - I_L(t_0)} \quad (9)$$

However, for a real inductor, e.g. first coil 42 ($L_1$) represented by a the second-order system illustrated in FIG.

5, the phase angle between the current through the inductor $L_1$ and the voltage thereacross will be different from 90 degrees. Accordingly, the phase angle between the measure of current I—from the voltage across the resistor 110 ($R_S$)—and the voltage $V_L$ across the first coil 42 ($L_1$) can be used to augment the calculation of the inductance of the first coil 42 ($L_1$), so as to account for the affects of the associated resistance $R_{L1}$ and/or capacitance $C_{L1}$. Other changes to the resistance of the first resonant circuit 106, i.e. changes external to the first coil 42 ($L_1$), e.g. changes to the resistance of an associated connector—e.g. as caused by a loose connector or faulty connection—would not affect the phase angle between the measure of current I and the voltage across the first coil 42 ($L_1$), but would affect both the magnitude of the current I and the phase angle of this current I relative to the first signal 44.

The processor 132 senses the voltage $V_L$ and current I signals in real time in order to either diagnose a failure of or change to either the first coil 42 ($L_1$) or elements of the associated first resonant circuit 106, or to discriminate a crash or other condition affecting the magnetic circuit 38. In addition to using the magnitudes of the voltage $V_L$ and current I, the processor can also use the relative phase thereof, or the phase of either the voltage $V_L$ or current I relative to that of the first signal 44, in order to determine, for example, the inductance $L_1'$ or impedance of the first coil 42 ($L_1$), the resistance $R_{L1}$ thereof, or the resistance of the first resonant circuit 106.

The processor 132 may further determine the power applied to the first coil 42 ($L_1$)—either reactive (V*I), real (V*I*cos(θ)), or both—which can be used as addition information for either failure detection, crash sensing, or sensing some other measure responsive to the reluctance $\mathcal{R}$ of the magnetic circuit 38.

The quality factor, or Q, of the first resonant circuit 106 is related to the bandwidth of the magnetic sensor 100, and is affected by the resistance of the first resonant circuit 106—i.e. either the intrinsic resistance of the coil, the resistance of the associated series resistor 110 ($R_S$), or the equivalent series resistance (ESR) of the associated first capacitor 108 ($C_S$). Accordingly, the Q of the first resonant circuit 106 can be set or adjusted by setting or adjusting the associated resistance of the first resonant circuit 106, for example, either by adjusting the intrinsic resistance of the first coil 42 ($L_1$)—which is described more fully hereinbelow,—or by adjusting the resistance of the series resistor 110 ($R_S$). The overall sensitivity of the magnetic sensor 100 to associated magnetic disturbances in or to the magnetic circuit 38 is affected by the relative amount by which the oscillation frequency differs from the resonant frequency of the first resonant circuit 106, and this sensitivity to that change is affected by the Q of the first resonant circuit 106. For example, this sensitivity or gain is highest when the oscillation frequency is equal to the resonant frequency, and is reduced as the relative difference increases, as illustrated in FIG. 6, wherein the sensitivity of this reduction to changes in the relative frequency difference is directly related to the Q of the first resonant circuit 106—as Q increases, sensitivity becomes more sensitive to the relative frequency difference.

In accordance with a second embodiment of a subsystem for sensing one or more variables associated with the first resonant circuit 106, the voltage $V_L$ across the first coil 42 ($L_1$) is sensed as described hereinabove, without separately sensing the voltage $V_{RS}$ across the resistor 110 ($R_S$). The voltage $V_L$ across the first coil 42 ($L_1$) will be responsive to the current I through the first coil 42 ($L_1$) as follows:

$$V_L = I \cdot Z_L \quad (10)$$

where $Z_L$ is the impedance of the first coil 42 ($L_1$). The current I through the first resonant circuit 106 is given by:

$$I = \frac{V}{Z_L + Z_{CS} + R_S} \quad (11)$$

where V is the voltage of the first signal 44, $Z_{CS}$ is the impedance of the first capacitor 108 ($C_S$), and $R_S$ is the impedance of the resistor 110 ($R_S$) (if present). The impedance $Z_L$ of the first coil 42 ($L_1$) is then given as a function of the voltages V of the first signal 44 and $V_L$ across the first coil 42 ($L_1$) as follows:

$$Z_L = \frac{Z_{CS} + R_S}{\frac{V}{V_L} - 1} \quad (12)$$

For example, assuming that the voltage V of the first signal 44, the impedance $Z_C$ the first capacitor 108 ($C_S$), and the impedance $R_S$ of the resistor 110 ($R_S$) (if present) are constant, then the impedance $Z_L$ of the first coil 42 ($L_1$) is given as a function of the voltage $V_L$ thereacross.

In accordance with a third embodiment of a subsystem for sensing one or more variables associated with the first resonant circuit 106, the voltage $V_{RS}$ across the resistor 110 ($R_S$) is sensed as described hereinabove, without separately sensing the voltage $V_L$ across the first coil 42 ($L_1$). The voltage $V_{RS}$ across the resistor 110 ($R_S$) is responsive to the current $I_L$ through the first coil 42 ($L_1$) as described hereinabove, and is responsive to the condition of resonance as illustrated in FIG. 6. Furthermore, the relationship between the voltage $V_{RS}$ across the resistor 110 ($R_S$)—or the associated measure of current I therethrough—and the voltage V of the first signal 44 is responsive to the impedances $Z_L$ and $Z_{CS}$ of the first coil 42 ($L_1$) and first capacitor 108 ($C_S$) respectively and the resistance $R_S$ of the resistor 110 ($R_S$), e.g. as illustrated by equation (11) hereinabove.

In accordance with a fourth embodiment of a subsystem for sensing one or more variables associated with the first resonant circuit 106, the voltage Vc across the first capacitor 108 ($C_S$)—or the voltage ($V_C+V_{RS}$) across the series combination of the first capacitor 108 ($C_S$) and resistor 110 ($R_S$)—can be sensed as an alternative to, or in addition to, sensing the voltage $V_L$ across the first coil 42 ($L_1$) or the voltage $V_{RS}$ across the resistor 110 ($R_S$). For example, the voltage $V_L$ across the first coil 42 ($L_1$) is given by:

$$V_L = V_1 - (V_{CS} + V_{RS}) \quad (13)$$

Referring to FIGS. 4 and 9, in accordance with a fifth embodiment of a subsystem for sensing one or more variables associated with the first resonant circuit 106, the relative phase of third 152 and fourth 154 signals, e.g. the voltage $V_L$ across the first coil 42 ($L_1$) and the voltage $V_{RS}$ across the resistor 110 ($R_S$), is determined directly by the processor 132 by an associated process 900, wherein the third 152 ($V_L$) and fourth 154 ($V_{RS}$) signals are input to the processor 132 through respective third 142 and fourth 148 analog-to-digital converters, are read by the processor in step (902). In step (904), if a phase timer has been previously started, then in step (906) the phase timer is incremented, wherein the phase timer measures the time difference between associated positive-going zero crossings of the third 152 ($V_L$) and fourth 154 ($V_{RS}$) signals, and thereby is used to generate a measure of the relative phase thereof. In step (910), a first average value $\overline{V}_L$ of the third signal 152 ($V_L$) is determined, for example, using a running average or low pass filtering process. In step (912), a second average value $\overline{V}_{RS}$ of the fourth signal 154 ($V_{RS}$) is determined, for example, using a running average or low pass filtering process, e.g. similar to that used in step (910). The respective average values $\overline{V}_L$ and $\overline{V}_{RS}$ represent the long term average values of the respective third 152 ($V_L$) and fourth 154 ($V_{RS}$) signals, which, for example, for an associated mono-polar electrical circuit 102 would be corresponding non-zero bias values about which oscillate the associated oscillatory third 152 ($V_L$) and fourth 154 ($V_{RS}$) signals. For example, for a sinusoidal signal oscillating between extremes of +1 and +5 volts, the associated average value would be +3 volts, or its equivalent representation in the processor 132. Then, in step (914), the third signal 152 ($V_L$) is compared with the associated first average value $\overline{V}_L$, and if the third signal 152 ($V_L$) is greater, then, in step (916), an associated first binary value $V_L^*$ is set to one; otherwise, in step (918), the associated first binary value $V_L^*$ is set to zero. Then, in step (920), if the first binary value $V_L^*$ has undergone a transition from zero to one—thereby exhibiting a leading edge, and indicating the occurrence of a positive-going zero crossing of the third signal 152 ($V_L$),—then, in step (922), the phase timer is reset to an initial value, e.g. zero, and then started. Following step (922), or otherwise from step (920), in step (924), the fourth signal 154 ($V_{RS}$) is compared with the associated second average value $\overline{V}_{RS}$, and if the fourth signal 154 ($V_{RS}$) is greater, then, in step (926), an associated second binary value $V_{RS}^*$ is set to one; otherwise, in step (928), the associated second binary value $V_{RS}^*$ is set to zero. Then, in step (930), if the second binary value $V^*_{RS}$ has undergone a transition from zero to one—thereby exhibiting a leading edge, and indicating the occurrence of a positive-going zero crossing of the fourth signal 154 ($V_{RS}$),—then in step (932) the value of the phase timer is stored, and the process repeats with step (902). Otherwise, from step (930), the process repeats with step (902). A stored value of the phase timer less than a value corresponding to a period of a half wave length corresponds to the third signal 152 ($V_L$) lagging with respect to the fourth signal 154 ($V_{RS}$); a stored value of the phase timer greater than the value corresponding to a period of a half wave length corresponds to the third signal 152 ($V_L$) leading with respect to the fourth signal 154 ($V_{RS}$); and a stored value of the phase timer equal to the value corresponding to a period of a half wave length corresponds to the third signal 152 ($V_L$) being 180 degrees out of phase with respect to the fourth signal 154 ($V_{RS}$).

Figure 10:
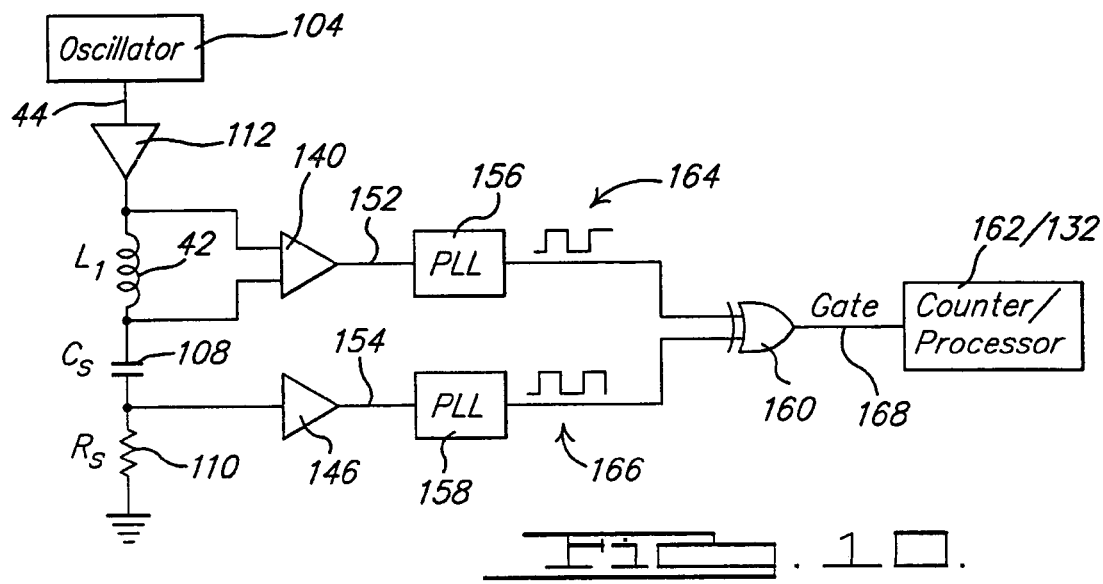
FIG. 10 illustrates a block diagram of a circuit for determining a relative phase difference of two signals.

Referring to FIG. 10, in accordance with a sixth embodiment of a subsystem for sensing one or more variables associated with the first resonant circuit 106, the relative phase of the third 152 ($V_L$) and fourth 154 ($V_{RS}$) signals can be measured with an apparatus comprising first 156 and second 158 phase-locked-loops (PLL), the respective inputs of which are operatively coupled to the respective third 152 ($V_L$) and fourth 154 ($V_{RS}$) signals, the respective outputs of which are coupled to an exclusive-OR (XOR) gate 160, the output of which is used to control gate of a counter 162, which counter 162 may be incorporated in, or implemented in software by, the processor 132. More particularly, the first phase-locked-loop 156 (PLL) generates a first coherent square wave 164 that is phase-aligned with the third signal 152 ($V_L$), and the second phase-locked-loop 158 (PLL) generates a second coherent square wave 166 that is phase-aligned with the fourth signal 154 ($V_{RS}$). The output signal 168 of the exclusive-OR (XOR) gate 160 is ON when the values of the first 164 and second 166 coherent square waves are different—corresponding to periods of associated relative phase difference,—and is OFF when the values of the first 164 and second 166 coherent square waves are the same. The counter 162 is reset responsive to a positive-going leading edge of the output signal 168, and thereafter continues to count at a fixed rate until the output signal 168 returns to an OFF condition, at which time the associated value of the counter is stored. Accordingly, the counter 162 measures the period of time corresponding to the phase difference of the third 152 ($V_L$) and fourth 154 ($V_{RS}$) signals. A stored counter value less than a value corresponding to a period of a half wave length corresponds to the third signal 152 ($V_L$) lagging with respect to the fourth signal 154 ($V_{RS}$); a stored counter value greater than the value corresponding to a period of a half wave length corresponds to the third signal 152 ($V_L$) leading with respect to the fourth signal 154 ($V_{RS}$); and a stored counter value equal to the value corresponding to a period of a half wave length corresponds to the third signal 152 ($V_L$) being 180 degrees out of phase with respect to the fourth signal 154 ($V_{RS}$).

Figure 11:
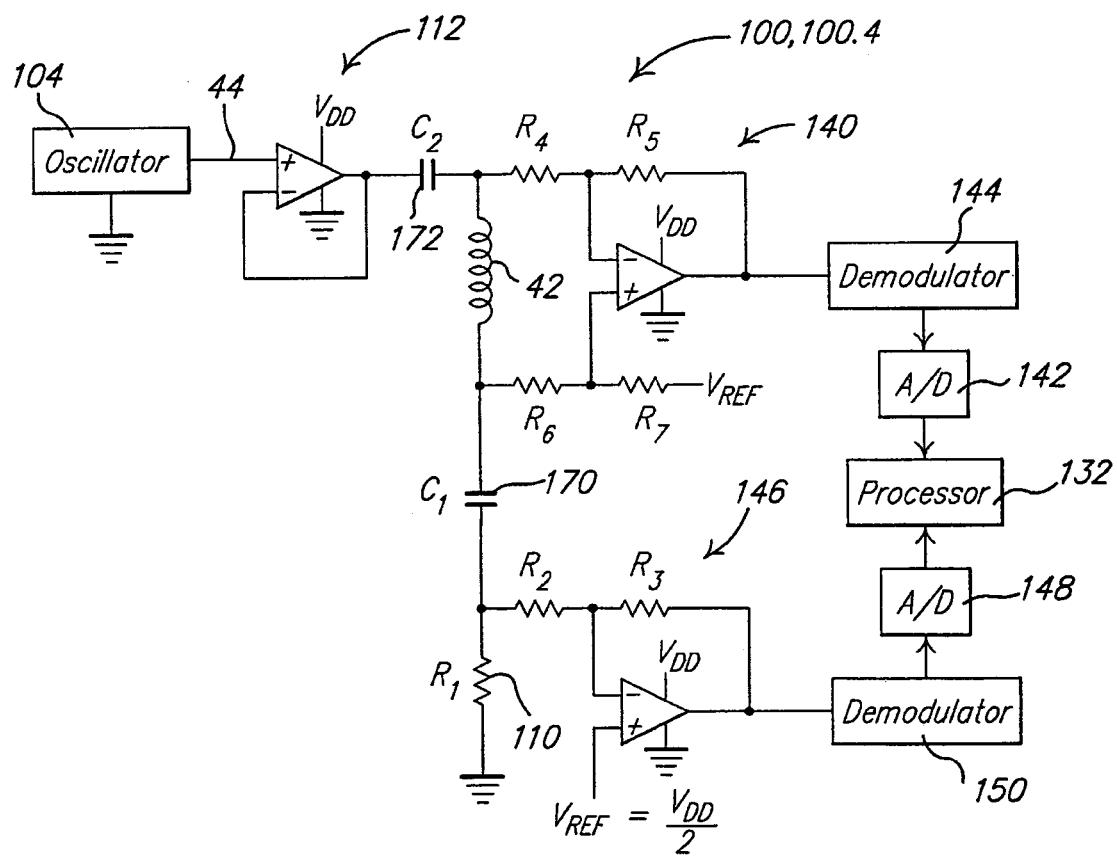
FIG. 11 illustrates a block diagram of an embodiment of a magnetic sensor incorporating a first resonant circuit with distributed capacitance.

Referring to FIG. 11, in accordance with a fourth embodiment of the magnetic sensor 100.4, the capacitance $C_S$ of the first capacitor 108 ($C_S$) in the embodiments illustrated in FIG. 4 can be distributed amongst a plurality of capacitors, for example, third 170 ($C_1$) and fourth 172 ($C_2$) capacitors, each connected to different ends of the first coil 42 ($L_1$)—i.e. so that the first coil 42 ($L_1$) is connected between the third 170 ($C_1$) and fourth 172 ($C_2$) capacitors,—wherein the capacitances of the third 170 ($C_1$) and fourth 172 ($C_2$) capacitors are adapted so that the capacitance of their combination in series is equal to the capacitance $C_S$ of the first capacitor 108 ($C_S$), as follows:

$$C_S = \frac{C_1 \cdot C_2}{C_1 + C_2} \quad (14)$$

This distribution of capacitance to both sides of the first coil 42 ($L_1$) is beneficial in providing for tolerating shorts to either power or ground in the conductors that couple the first coil 42 ($L_1$) to the associated electrical circuit 102, which shorts might otherwise damage the associated electrical circuit 102, but which instead are readily detected by the above described embodiments for sensing one or more variables associated with the first resonant circuit 106. For example, typically the first coil 42 ($L_1$) would be connected to the associated electrical circuit 102 with a cable or wiring harness, which might be susceptible to the above described faults during assembly or operation of the vehicle 12. The resonance conditions of the first resonant circuit 106 are otherwise as described hereinabove for a first resonant circuit 106 incorporating a single first capacitor 108 ($C_S$).

In accordance with a fifth embodiment of the magnetic sensor 100.5, the resistance $R_{L1}$ of the first coil 42 ($L_1$) increases if the wire gauge thereof is reduced, or the number of turns N thereof is increased. If the resistance $R_{L1}$ of the first coil 42 ($L_1$) is sufficient to limit the maximum current I in the first resonant circuit 106 to an acceptable level, then the resistor 110 ($R_S$) can be eliminated from the first resonant circuit 106. This arrangement also provides for improved sensitivity of the voltage ($V_L$) across the first coil 42 ($L_1$) to changes in the resistance $R_{L1}$ of the first coil 42 ($L_1$), e.g. as might be caused by a shorting of one or more turns within the first coil 42 ($L_1$); which otherwise for a system incorporating a resistor 110 ($R_S$) in the first resonant circuit 106, increases as the ratio of the resistance $R_{L1}$ to the resistance $R_S$ increases. For example, the intrinsic resistance of the first coil 42 ($L_1$) can be set to a value between about 0.1 ohms and 10 ohms by adjusting the associated wire size (gauge) and/or length of wire (number of turns). For a first coil 42 ($L_1$) of 60 turns, if the total intrinsic resistance thereof were 0.1 ohms, the resistance per turn would be 0.0001666 ohms per turn; whereas if the total intrinsic resistance were 10 ohms, the resistance per turn would be 0.16 ohms per turn, the latter of which would be substantially easier to measure. In addition to being affected by the total intrinsic resistance of the first coil 42 ($L_1$), the detectability of shorted turns is also affected by resistance of the series resistor 110 ($R_S$) in relation to that of the first coil 42 ($L_1$), and can be improved by increasing the gain of the fourth amplifier 146 used to amplify the voltage across the resistor 110 ($R_S$).

In accordance with the above described embodiments, the oscillation frequency $f_0$ may be adapted to provide for a resonant or near-resonant condition at the nominal state of the vehicle 12 and the associated magnetic circuit 38 (i.e. pre-crash); or may be adapted to be off-resonance for the nominal condition of the vehicle body 26 and the associated magnetic circuit 38, and then to provide for a resonant or near-resonant condition responsive to a crash, as a result of an associated shift in the inductance $L_1'$ or $L_2'$ of the first coil 42 ($L_1$) or the second coil 54 ($L_2$). Furthermore, the magnetic sensor 100 could incorporate a plurality of distinct frequencies, different frequencies being adapted to provide for an associated resonance for different associated conditions of the vehicle body 26.

Referring to FIG. 4, in accordance with a sixth embodiment of the magnetic sensor 100.6, the oscillator 104 may be adapted to be controllable responsive to a signal 174 from the processor 132. For example, the oscillator 104 may be a voltage controlled oscillator (VCO). In operation, the oscillation frequency $f_0$ of the oscillator 104 is swept through—in either a stepwise or continuous fashion—the associated resonant frequency $f_n$ of the first resonant circuit 106. An output from the oscillator can be coupled to the processor 132, either directly, or, if analog, through a fifth analog-to-digital converter 176, so as to provide a measure of the output from the oscillator, for example, the oscillation frequency $f_0$ or associated level V of the first signal 44. For example, the processor 132 could directly sense the first signal 44, and then determine the associated level V and oscillation frequency $f_0$ directly therefrom. The particular resonant frequency can then be identified as the oscillation frequency $f_0$ for which the voltage across either the first coil 42 ($L_1$), the first capacitor 108 ($C_S$) or the resistor 110 ($R_S$) is maximized, and the associated inductance $L_1'$ of the first coil 42 ($L_1$) can be identified therefrom. Similarly, the associated inductance $L_2'$ of the second coil 54 ($L_2$) can be identified after determining by similar means the resonant frequency $f_{n\_2}$ of the second resonant circuit 116.

The particular operating point on the frequency response characteristic—e.g. as illustrated in FIG. 6—of the first resonant circuit 106 will affect the amount of power transferred to the magnetic circuit 38 by the oscillator 104/first buffer amplifier 112. In one embodiment, upon initialization of the magnetic sensor 100, the resonant frequency of the first resonant circuit 106 and the nature of the associated frequency response is identified by sweeping the oscillation frequency and monitoring the response from the associated magnetic sensing element 50, generally as described hereinabove, either using the primary oscillator 104 as the signal source, or another oscillator, so as to provide for measuring both the resonant frequency of the first resonant circuit 106, and its associated frequency response. If the resulting measured resonant frequency is different from the nominal oscillation frequency $f_0$ of the oscillator 104, then thereafter, when operating at the nominal oscillation frequency $f_0$, one or more software or hardware parameters or variables would be adjusted, e.g. in accordance with a correction factor, to accommodate the associated degradation in gain caused by operating with an oscillation frequency $f_0$ that differs from the resonant frequency of the associated first resonant circuit 106. Accordingly, this embodiment provides for adapting to relatively long term changes in the magnetic sensor 100, for example, as might result from either production variability, temperature, or aging. A warning can be generated or activated, e.g. via an indicator or alarm, if the magnitude of the associated correction factor exceeds a threshold, e.g. indicative of the need for maintenance or repair.

For example, if the first coil 42 ($L_1$) were an ideal inductor having an inductance of $L_1$, then if the resonant frequency were determined to be $f_n$, then the inductance $L_1$ would be given by:

$$L_1 = \frac{1}{4 \cdot \pi^2 \cdot f_n^2 \cdot C_S} \quad (15)$$

In accordance with another aspect of the sixth embodiment, either the oscillator 104 or an associated amplifier, e.g. the first buffer amplifier 112, may be controlled responsive to a signal 174 from the processor 132, or another controller, so as to control the level of current I to the first coil 42 ($L_1$), as sensed from the voltage $V_{RS}$ across the resistor 110 ($R_S$). By operating at least near resonance, the impedance of the first resonant circuit 106 is at least substantially resistive, which simplifies the associated control algorithm for controlling the level of current I. For example, the current I may be controlled to a constant value using a relatively low bandwidth control algorithm which is fast enough so as to correct for long term variations, e.g. resulting from production variations, temperature effects, or aging, but is slow enough so as to not adversely affect a crash induced perturbation or variation of the current I. Accordingly, this closed loop current control system provides for maintaining the nominal level of current I through the first coil 42 ($L_1$) so as to correspondingly maintain an associated nominal level of magnetic flux 49, $\phi$ in the associated magnetic circuit 38, thereby accommodating changes to the first resonant circuit 106 that might affect the resonant frequency thereof, and accordingly, might otherwise adversely affect the level of current I as a result of the inherent frequency response of the first resonant circuit 106 and its associated bandwidth.

Responsive to the detection of a crash, or other condition affecting the vehicle body 26 or associated magnetic circuit 38, or responsive to the detection of a failure of a component of the magnetic sensor 100, by any of the above described embodiments, the processor 132 can then either actuate an associated safety restraint actuator 64, or an associated indicator 178, as necessary to either protect or inform an occupant of the vehicle 12.

Referring to FIG. 12, the current I in the first coil 42 may be used to provide a measure of the opening angle $\alpha$ of the door 14 as a result of the affect thereof on the reluctance of the associated magnetic circuit 38. Alternately, or in addition to this measure, the opening angle α of the door 14 may be detected by providing a third coil 180 operatively coupled to the door 14, which cooperates with the first coil 42 operatively coupled to a relatively fixed portion of the vehicle 12, e.g. about the axis 182 of a fixed portion of a door hinge 18. For example, the third coil 180 could be located about an axis 184 that rotates with the door 14, e.g. an axis of a moveable portion of a hinge 18. The third coil 180 is located either in the near field of the first coil 42, or in the associated magnetic circuit 38 so as to be rotatable in relation to the direction of the magnetic flux 49, φ therein, so that a signal from the third coil 180 is responsive to the magnetic flux 49, φ generated by the first coil 42 responsive to a current I applied thereto, and is responsive to the mutual coupling of the magnetic flux 49, φ between the first 42 and third 180 coils. This mutual coupling is responsive to the alignment between the first 42 and third 180 coils, which depends upon the opening angle α of the door 14. A signal from the third coil 180 can provide a measure of whether the door 14 is open and/or a measure of the associated opening angle α. The third coil 180 can also be used a sense coil 62 as described hereinabove, which can provide an indication of the operativeness of the first coil 42. The third coil 180 can also be used as a sensor in a feedback control system (e.g. an automatic gain control (AGC)) which is adapted to control the level of magnetic flux 49, φ generated by the first coil 42, which can also be adapted so that one or more signals from the associated control system provide either a measure of the door opening status or angle α, or a measure of energy flow responsive to a crash, or both.

Referring to FIG. 13, in accordance with another embodiment, a vehicle 12 incorporates a magnetic crash sensing system 200 comprising first 202 and second 204 magnetic sensors operatively associated with the left 206 and right 208 sides of the vehicle 12, respectively.

The first magnetic sensor 202 comprises an associated oscillator 210.1 operatively coupled to an associated coil driver 212.1 which is operatively coupled to an associated first resonant circuit 214.1 comprising an associated first coil 216.1 in series with an associated first capacitor 218.1, wherein the associated first coil 216.1 is located at an associated first location 220.1 on an associated magnetic circuit 222.1 thereof. The first magnetic sensor 202 further comprises an associated magnetic sensing element 224.1 comprising, for example, an associated second coil 224.1', which is illustrated as part of a second resonant circuit 226.1 further comprising a second capacitor 228.1 in parallel with the second coil 224.1. The associated magnetic sensing element 224.1 is located at an associated second location 230.1 on the associated magnetic circuit 222.1. For example, the first 220.1 and second 230.1 locations respectively are illustrated as respectively comprising a hinge 18 and a striker 22 of a door 14 on the left side 206 of the vehicle 14. The output of the second resonant circuit 226.1 is amplified/buffered by an associated first amplifier 232.1, e.g. a differential amplifier, the output of which is processed by an associated preprocessing circuit 234.1, for example, comprising elements comparable to the first amplifier 122, first coupling capacitor 124, first demodulator 126, second coupling capacitor 134, second amplifier 128, and third amplifier 136 as illustrated in FIG. 4 and described hereinabove. The output of the associated preprocessing circuit 234.1 is converted to digital form by at least one associated first analog-to-digital converter 236.1, and the signal therefrom input to an associated processor 238.

The second magnetic sensor 204 comprises an associated oscillator 210.2 operatively coupled to an associated coil driver 212.2 which is operatively coupled to an associated first resonant circuit 214.2 comprising an associated first coil 216.2 in series with an associated first capacitor 218.2, wherein the associated first coil 216.2 is located at an associated first location 220.2 on an associated magnetic circuit 222.2 thereof. The second magnetic sensor 204 further comprises an associated magnetic sensing element 224.2 comprising, for example, an associated second coil 224.2', which is illustrated as part of a second resonant circuit 226.2 further comprising a second capacitor 228.2 in parallel with the second coil 224.2. The associated magnetic sensing element 224.2 is located at an associated second location 230.2 on the associated magnetic circuit 222.2. For example, the first 220.2 and second 230.2 locations respectively are illustrated as respectively comprising a hinge 18 and a striker 22 of a door 14 on the right side 208 of the vehicle 14. The output of the second resonant circuit 226.2 is amplified/buffered by an associated first amplifier 232.2, e.g. a differential amplifier, the output of which is processed by an associated preprocessing circuit 234.2, for example, comprising elements comparable to the first amplifier 122, first coupling capacitor 124, first demodulator 126, second coupling capacitor 134, second amplifier 128, and third amplifier 136 as illustrated in FIG. 4 and described hereinabove. The output of the associated preprocessing circuit 234.2 is converted to digital form by at least one associated first analog-to-digital converter 236.2, and the signal therefrom input to the processor 238.

The first 202 and second 204 magnetic sensors, as described heretofore, are adapted to each individually function in cooperation with the corresponding left 206 and right 208 sides of the vehicle 12 in accordance with any of the earlier described embodiments of magnetic sensors, for example, as identified by magnetic sensors 10, 100, 100.1, 100.2, 100.3, 100.4, 100.5, 100.6.

Furthermore, the oscillation frequency $f_1$ of the oscillator 210.1 associated with the first magnetic sensor 202 is adapted to be different from the oscillation frequency $f_2$ associated with the oscillator 210.2 of the second magnetic sensor 204, so that the signals from the corresponding first coils 216.1 and 216.2 can be differentiated from one another, to the extent that the magnetic circuits 222.1, 222.2 associated with the first coils 216.1, 216.2 associated with one magnetic sensor 202, 204 interact with the magnetic sensing elements 224.2, 224.1 associated with the other magnetic sensor 204, 202. For example, in one embodiment, the oscillation frequency $f_1$ of the oscillator 210.1 associated with the first magnetic sensor 202 is about 10 KHz, whereas the oscillation frequency $f_2$ associated with the oscillator 210.2 of the second magnetic sensor 204 is about 20 KHz. It may be beneficial for the respective oscillation frequencies $f_1$ and $f_2$ to be adapted so that one is not a harmonic of the other, for example, so that the oscillation frequencies $f_1$ and $f_2$ are relatively indivisible or irrational with respect to one another, so as to preclude the prospect of a harmonic of a signal generated by one magnetic sensor 202, 204 being interpreted as originating from the other magnetic sensor 204, 202.

The first magnetic sensor 202 further comprises an associated third resonant circuit 240.1, e.g. comprising a series combination of an associated inductor 242.1 (e.g. a third coil 242.1') and a third capacitor 244.1. The third resonant circuit 240.1 further comprises an associated current sensor 246.1, for example an associated series resistor 248.1 and an associated second amplifier 250.1, e.g. a differential amplifier, adapted to measure the voltage across the associated series resistor 248.1. The current sensor 246.1 may be embodied in other ways, for example by measuring the voltage across either the associated inductor 242.1 or the associated third capacitor 244.1, or by measuring a magnetic field generated by the current flowing in the associated third resonant circuit 240.1. The third resonant circuit 240.1 is adapted to have a resonant frequency $f_{3.1}$ that is substantially equal to the oscillation frequency $f_2$ associated with the oscillator 210.2 of the second magnetic sensor 204. The output of the associated current sensor 246.1, e.g. the output of the associated second amplifier 250.1, is operatively coupled to a second analog-to-digital converter 252.1, and the output therefrom is operatively coupled to the processor 238.

Furthermore, the second magnetic sensor 204 further comprises an associated third resonant circuit 240.2, e.g. comprising a series combination of an associated inductor 242.2 (e.g. a third coil 242.2') and a third capacitor 244.2. The third resonant circuit 240.2 further comprises an associated current sensor 246.2, for example an associated series resistor 248.2 and an associated second amplifier 250.2, e.g. a differential amplifier, adapted to measure the voltage across the associated series resistor 248.2. The current sensor 246.2 may be embodied in other ways, for example by measuring the voltage across either the associated inductor 242.2 or the associated third capacitor 244.2, or by measuring a magnetic field generated by the current flowing in the associated third resonant circuit 240.2. The third resonant circuit 240.2 is adapted to have a resonant frequency $f_{3.2}$ that is substantially equal to the oscillation frequency $f_1$ associated with the oscillator 210.1 of the first magnetic sensor 202. The output of the associated current sensor 246.2, e.g. the output of the associated second amplifier 250.2, is operatively coupled to a second analog-to-digital converter 252.2, and the output therefrom is operatively coupled to the processor 238.

The magnetic circuit 222.1 associated with the first coil 216.1 of the first magnetic sensor 202 includes both second locations 230.1 and 230.2 respectively associated with the first 202 and second 204 magnetic sensors respectively. Similarly, the magnetic circuit 222.2 associated with the first coil 216.2 of the second magnetic sensor 204 includes both second locations 230.2 and 230.1 respectively associated with the second 204 and first 202 magnetic sensors respectively. Accordingly, magnetic flux 49, φ generated by the first coil 216.1 of the first magnetic sensor 202 is sensed by the magnetic sensing element 224.2 of the second magnetic sensor 204, and magnetic flux 49, φ generated by the first coil 216.2 of the second magnetic sensor 204 is sensed by the magnetic sensing element 224.1 of the first magnetic sensor 202. The third resonant circuits 240.1, 240.2 are series resonant, and accordingly, have a minimum resistance at their respective resonant frequencies $f_{3.1}, f_{3.2}$, so that the frequency response of current therethrough exhibits a maximum at the respective resonant frequencies $f_{3.1}, f_{3.2}$. Stated in another way, each third resonant circuit 240.1, 240.2 acts as a current sink at its respective resonant frequency $f_{3.1}, f_{3.2}$, and a measure of current therethrough provides a measure of the magnitude of an associated frequency component of the magnetic flux 49, φ, having the corresponding resonant frequency $f_{3.1}, f_{3.2}$, that is sensed by the corresponding first coil 216.1, 216.2. Accordingly, the current sensed by the current sensor 246.1 associated with the first magnetic sensor 202 provides a measure of the operativeness and operation of the first coil 216.2 associated with the second magnetic sensor 204, and the current sensed by the current sensor 246.2 associated with the second magnetic sensor 204 provides a measure of the operativeness and operation of the first coil 216.1 associated with the first magnetic sensor 202, so that each magnetic sensor 202, 204 can be used to verify the operation of the other, and thereby provide a measure for safing the other magnetic sensor 204, 202.

Responsive to a first measure of operativeness of the first coil 216.1 associated with the left side 206 of the vehicle 12—which first measure of operativeness is responsive to a signal from the current sensor 246.2 associated with the third resonant circuit 240.2 associated with the second magnetic sensor 204 associated with the right side 208 of the vehicle 12—the processor 238 provides for disabling a first safety restraint actuator 254.1 associated with the left side 206 of the vehicle 12 if the first measure of operativeness indicates that the first coil 216.1 is inoperative. Otherwise, if the first magnetic sensor 202 is otherwise operative, then the first safety restraint actuator 254.1 associated with the left side 206 of the vehicle 12 is actuated responsive to a signal from the associated magnetic sensing element 224.1 associated with the first magnetic sensor 202 associated with the left side 206 of the vehicle 12.

Responsive to a second measure of operativeness of the first coil 216.2 associated with the right side 208 of the vehicle 12—which second measure of operativeness is responsive a signal from the current sensor 246.1 associated with the third resonant circuit 240.1 associated with the first magnetic sensor 202 associated with the left side 206 of the vehicle 12—the processor 238 provides for disabling a second safety restraint actuator 254.2 associated with the right side 208 of the vehicle 12 if the second measure of operativeness indicates that the first coil 216.2 is inoperative. Otherwise, if the second magnetic sensor 204 is otherwise operative, then the second safety restraint actuator 254.2 associated with the right side 208 of the vehicle 12 is actuated responsive to a signal from the associated magnetic sensing element 224.2 associated with the second magnetic sensor 204 associated with the right side 208 of the vehicle 12.

While specific embodiments have been described in detail in the foregoing detailed description and illustrated in the accompanying drawings, those with ordinary skill in the art will appreciate that various modifications and alternatives to those details could be developed in light of the overall teachings of the disclosure.

For example, it should be understood that the above described embodiments, although described separately herein, can be combined with one another as additional embodiments of the magnetic sensor 100. The sensitivity of the magnetic sensor 100 to crashes, or other detectable events, can be set to a desired level by adjusting gain and/or threshold values associated therewith. Furthermore, in addition crash sensing and safing, the above described embodiments—when incorporating a magnetic circuit 38 involving a door 14—can be used to detect the state of opening (i.e. open or closed) of the door 14, either responsive to the self inductance of the first coil 42, or responsive to a second signal 114 from an associated magnetic sensing element 50/second coil 54.

Accordingly, the particular arrangements disclosed are meant to be illustrative only and not limiting as to the scope of the invention, which is to be given the full breadth of the appended claims and any and all equivalents thereof.

I claim:

1. A magnetic sensor, comprising:
   a. at least one coil operatively associated with a magnetic circuit of a vehicle body or structure, wherein said magnetic circuit comprises at least a portion of said vehicle body or structure, said at least one coil is adapted to cooperate with a time-varying magnetic flux in said vehicle body or structure, said time-varying magnetic flux is generated or sensed by said at least one coil, and said time-varying magnetic flux is responsive to a condition of said vehicle body or structure that is sensed by the magnetic sensor, and b. at least one electrical circuit operatively coupled to said at least one coil, wherein said at least one electrical circuit is adapted so that said at least one coil in cooperation with said at least one electrical circuit exhibits a resonant or near-resonant condition in association with said time-varying magnetic flux for at least one condition of said vehicle body or structure.

2. A magnetic sensor, comprising:
a. at least one coil operatively associated with a magnetic circuit of a vehicle body or structure, wherein said magnetic circuit comprises at least one ferromagnetic element of said vehicle body or structure, said at least one coil is adapted to cooperate with a time-varying varying magnetic flux in said vehicle body or structure, said time-varying magnetic flux is generated or sensed by said at least one coil, and said time-varying magnetic flux is responsive to a condition of said vehicle body or structure that is sensed by the magnetic sensor; and
b. at least one electrical circuit operatively coupled to said at least one coil, wherein said at least one electrical circuit is adapted so that said at least one coil in cooperation with said at least one electrical circuit exhibits a resonant or near-resonant condition in association with said time-varying magnetic flux for at least one condition of said vehicle body or structure.

3. A magnetic sensor as recited in claim 1, wherein said at least one condition of said vehicle body or structure comprises a nominal condition of said vehicle body or structure.

4. A magnetic sensor as recited in claim 1, wherein said at least one condition of said vehicle body or structure comprises a deformed condition of said vehicle body or structure.

5. A magnetic sensor as recited in claim 1, wherein said at least one condition of said vehicle body or structure comprises a defective condition of said vehicle body or structure.

6. A magnetic sensor as recited in claim 1, wherein said at least one electrical circuit comprises a first electrical circuit comprising:
a. at least one first coil of said at least one coil;
b. at least one first capacitor in series with said at least one first coil; and
c. an oscillator, wherein said oscillator generates a first signal that is applied to said at least one first coil, and a first resonant frequency of said at least one first coil in combination with said at least one first capacitor is at or near a frequency of said first signal for at least one condition of said vehicle body or structure.

7. A magnetic sensor as recited in claim 6, wherein said oscillator comprises a sinusoidal oscillator.

8. A magnetic sensor as recited in claim 6, wherein said oscillator comprises a square wave oscillator.

9. A magnetic sensor as recited in claim 6 wherein said first electrical circuit is adapted so that said first signal applied to said at least one first coil is a mono-polar signal.

10. A magnetic sensor as recited in claim 6, wherein said at least one electrical circuit comprises at least one resistor in series with said at least one first coil.

11. A magnetic sensor as recited in claim 6, further comprising a processor, a circuit, or a combination thereof adapted to determine at least one measure selected from a measure responsive to or related to an inductance of said at least one first coil, a measure responsive to or related to a resistance of said at least one first coil, a measure responsive to a phase angle between a voltage across said at least one first coil and a current through said at least one first coil, a measure of reactive power applied to said at least one first coil, and a measure of real power absorbed by said at least one first coil.

12. A magnetic sensor, comprising:
a. at least one coil operatively associated with a magnetic circuit of a vehicle body or structure, wherein said at least one coil is adapted to cooperate with a time-varying magnetic flux in said vehicle body or structure, said time-varying magnetic flux is generated or sensed by said at least one coil, said time-varying magnetic flux is responsive to a condition of said vehicle body or structure that is sensed by the magnetic sensor, and said at least one coil is adapted so as to incorporate an inherent capacitance of a magnitude sufficient to provide for filtering a harmonic component of said first signal; and
b. at least one electrical circuit operatively coupled to said at least one coil, wherein said at least one electrical circuit is adapted so that said at least one coil in cooperation with said at least one electrical circuit exhibits a resonant or near-resonant condition in association with said time-varying magnetic flux for at least one condition of said vehicle body or structure, and said at least one electrical circuit comprises a first electrical circuit comprising:
i) at least one first coil of said at least one coil;
ii) at least one first capacitor in series with said at least one first coil; and
iii) an oscillator, wherein said oscillator generates a first signal that is applied to said at least one first coil, and a first resonant frequency of said at least one first coil in combination with said at least one first capacitor is at or near a frequency of said first signal for at least one condition of said vehicle body or structure.

13. A magnetic sensor, comprising:
a. at least one coil operatively associated with a magnetic circuit of a vehicle body or structure, wherein said at least one coil is adapted to cooperate wit a time-varying magnetic flux in said vehicle body or structure, said time-varying magnetic flux is generated or sensed by said at least one coil, said time-varying magnetic flux is responsive to a condition of said vehicle body or structure tat is sensed by the magnetic sensor, and a resistance of said at least one coil is greater than a total resistance of the remainder of elements of said at least one electrical circuit in series wit said at least one coil and driven by said oscillator; and
b. at least one electrical circuit operatively coupled to said at least one coil, wherein said at least one electrical circuit is adapted so that said at least one coil in cooperation with said at least one electrical circuit exhibits a resonant or near-resonant condition in association with said time-varying magnetic flux for at least one condition of said vehicle body or structure, and said at least one electrical circuit comprises a first electrical circuit comprising:
i) at least one first coil of said at least one coil;
ii) at least one first capacitor in series with said at least one first coil; and iii) an oscillator, wherein said oscillator generates a first signal that is applied to said at least one first coil, and a first resonant frequency of said at least one first coil in combination with said at least one first capacitor is at or near a frequency of said first signal for at least one condition of said vehicle body or structure.

14. A magnetic sensor, comprising:
a. at least one coil operatively associated with a magnetic circuit of a vehicle bottom or structure, wherein said at least one coil is adapted to cooperate with a time-varying magnetic flux in said vehicle body or structure, said time-varying magnetic flux is generated or sensed by said at least one coil, and said time-varying magnetic flux is responsive to a condition of said vehicle body or structure that is sensed by the magnetic sensor; and
b. at least one electrical circuit operatively coupled to said at least one coil, wherein said at least one electrical circuit is adapted so that said at least one coil in cooperation with said at least one electrical circuit exhibits a resonant or near-resonant condition in association with said time-varying magnetic flux for at least one condition of said vehicle body or structure, said at least one electrical circuit comprises at least one resistor in series with said at least one first coil, a total resistance of said at least one resistor is less than a resistance of said at least one first coil and said at least one electrical circuit comprises a first electrical circuit comprising:
  i) at least one first coil of said at one coil;
  ii) at least one first capacitor in series with said at least one first coil; and
  iii) an oscillator, wherein said oscillator generates a first signal that is applied to said at least one first coil, and a first resonant frequency of said at least one first coil in combination with said at least one first capacitor is at or near a frequency of said first signal for at least one condition of said vehicle body or structure.

15. A magnetic sensor, comprising:
a. at least one coil operatively associated with a magnetic circuit of a vehicle body or structure, wherein said at least one coil is adapted to cooperate with a time-varying magnetic flux in said vehicle body or structure, said time-varying magnetic flux is generated or sensed by said at least one coil, and said time-varying magnetic flux is responsive to a condition of said vehicle body or structure that is sensed by the magnetic sensor; and
b. at least one electrical circuit operatively coupled to said at least one coil, wherein said at least one electrical circuit is adapted so that said at least one coil in cooperation with said at least one electrical circuit exhibits a resonant or near-resonant condition in association with said time-varying magnetic flux for at least one condition of said vehicle body or structure, said electrical circuit is adapted for sensing at least one measure selected from a voltage across said at least one first coil, a current through said at least one first coil, a voltage across a resistor in series with said at least one first coil, and a voltage across said at least one first capacitor and said at least one electrical circuit comprises a first electrical circuit comprising:
  i) at least one first coil of said at least one coil;
  ii) at least one first capacitor in series with said at least one first coil; and
  iii) an oscillator, wherein said oscillator generates a first signal that is applied to said at least one first coil, and a first resonant frequency of said at least one first coil in combination with said at least one first capacitor is at or near a frequency of said first signal for at least one condition of said vehicle body or structure.

16. A magnetic sensor, comprising:
a. at least one coil operatively associated with a magnetic circuit of a vehicle body or structure, wherein said at least one coil is adapted to cooperate with a time-varying magnetic flux in said vehicle body or structure, said time-varying magnetic flux is generated or sensed by said at least one coil, and said time-varying magnetic flux is responsive to a condition of said vehicle body or structure that is sensed by the magnetic sensor; and
b. at least one electrical circuit operatively coupled to said at least one coil, wherein said at least one electrical circuit is adapted so that said at least one coil in cooperation with said at least one electrical circuit exhibits a resonant or near-resonant condition in association with said time-varying magnetic flux for at least one condition of said vehicle body or structure, and said at least one electrical circuit comprises a first electrical circuit comprising:
  i) at least one first coil of said at least one coil;
  ii) at least one first capacitor in series with said at least one first coil, wherein said at least one first capacitor comprises first and second capacitors, said at least one first coil is connected between said first and second capacitors, and said first and second capacitors and said at least one first coil are in series with one another; and
  iii) an oscillator, wherein said oscillator generates a first signal that is applied to said at least one first coil, said oscillator is in series with said first and second capacitors said at least one first coil therebetween, and a first resonant frequency of said at least one first coil in combination with said at least one first capacitor is at or near a frequency of said first signal for at least one condition of said vehicle body or structure.

17. A magnetic sensor, comprising:
a. at least one coil operatively associated with a magnetic circuit of a vehicle body or structure, wherein said at least one coil is adapted to cooperate with a time-varying magnetic flux in said vehicle body or structure, said time-varying magnetic flux is generated or sensed by said at least one coil, said time-varying magnetic flux is responsive to a condition of said vehicle body or structure that is sensed by the magnetic sensor, and said at least one coil comprises a first coil electrically connected to a first electrical circuit; and
b. at least one electrical circuit operatively coupled to said at least one coil, wherein said at least one electrical circuit is adapted so that said at least one coil in cooperation with said at least one electrical circuit exhibits a resonant or near-resonant condition in association with said time-varying magnetic flux for at least one condition of said vehicle body or structure, and said at lea one electrical circuit comprises a second electrical circuit comprising:
  i) at least one second coil of said at least one coil; and
  ii) at least one second capacitor in parallel with said at least one second coil, wherein a second resonant frequency of said at least one second coil in combination with said at least one second capacitor is at or near an oscillation frequency of said time-varying magnetic flux coupled to said at least one second coil for at least one condition of said vehicle body or structure, and said first and second electrical circuits are electrically isolated from one another and magnetically coupled to one another.

18. A magnetic sensor as recited in claim 17, wherein said second electrical circuit generates a second signal responsive to said time-varying magnetic flux coupled to said at least one second coil, and said second electrical circuit is adapted so tat said second signal is mono-polar.

19. A magnetic sensor, comprising:
  a. at least one coil operatively associated with a magnetic circuit of a vehicle body or structure, wherein said at least one coil is adapted to cooperate with a time-varying magnetic flux in said vehicle body or structure, said time-varying magnetic flux is generated or sensed by said at least one coil, said time-varying magnetic flux is responsive to a condition of said vehicle body or structure that is sensed by the magnetic sensor; and
  b. at least one electrical circuit operatively coupled to said at least one coil, wherein said at least one electrical circuit is adapted so that said at least one coil in cooperation with said at least one electrical circuit exhibits a resonant or near-resonant condition in association with said time-varying magnetic flux for at least one condition of said vehicle body or structure, said at least one electrical circuit comprises a first electrical circuit comprising:
     i) at least one first coil of said at least one coil;
     ii) at least one first capacitor in series with said at least one first coil; and
     iii) an oscillator, wherein said oscillator generates a first signal that is applied to said at least one first coil, and a first resonant frequency of said at least one first coil in combination with said at least one first capacitor is at or near a frequency of said first signal for at least one condition of said vehicle body or structure, and said at least one electrical circuit comprises a second electrical circuit comprising:
     iv) at least one second coil of said at least one coil; and
     v) at least one second capacitor in parallel with said at least one second coil, wherein a second resonant frequency of said at least one second coil in combination with said at least one second capacitor is at or near an oscillation frequency of said time-varying magnetic flux coupled to said at least one second coil for at least one condition of said vehicle body or structure, said second resonant frequency is substantially equal or near to said frequency of said first signal for at least one condition of said vehicle body or structure, and said first and second electrical circuits are electrically isolated from one another and magnetically coupled to one another.

20. A method of sensing a condition of a magnetic circuit, comprising:
  a. operatively associating at least one coil with the magnetic circuit so that a time-varying magnetic flux in said magnetic circuit is magnetically coupled with said at least one coil, wherein said magnetic circuit comprises at least a portion of a vehicle body or structure;
  b. operatively coupling said at least one coil to at least one electrical circuit;
  c. adapting said at least one electrical circuit so that an oscillation frequency of said time-varying magnetic flux is substantially at or near a resonant frequency of said at least one coil in cooperation with said at least one electrical circuit for at least one condition to of said magnetic circuit; and
  d. sensing a condition of said magnetic circuit from a signal associated with said at least one electrical circuit responsive to said at least one coil.

21. A method of sensing a condition of a magnetic circuit as recited in claim 20, wherein the operation of adapting stud at least one electrical circuit comprises operatively coupling at least one first capacitor in series with at least one first coil of said at least one coil, and applying an oscillatory first signal in series with said at least one first coil.

22. A method of sensing a condition of a magnetic circuit as recited in claim 21, wherein the operation of sensing a condition of said magnetic circuit comprises:
  a. sensing a signal selected from a voltage across said at least one first coil, a current through said at least one first coil, a voltage across a resistor in series with said at least one first coil, and a voltage across said at least one first capacitor, and
  b. comparing said signal wit a threshold.

23. A method of sensing a condition of a magnetic circuit as recited in claim 22, further comprising sensing from said signal the operativeness of said electrical circuit including said at least one first coil.

24. A method of sensing a condition of a magnetic circuit as recited in claim 21, wherein the operation of sensing a condition of said magnetic circuit comprises:
  a. sensing a signal selected from a measure responsive to or related to an inductance of said at least one first coil, a measure responsive to or related to a resistance of said at least one first coil, a measure responsive to a phase angle between a voltage across said at least one first coil and a current through said at least one first coil, a measure of reactive power applied to said at least one first coil, and a measure of real power absorbed by said at least one first coil; and
  b. comparing said signal with a threshold.

25. A method of sensing a condition of a magnetic circuit as recited in claim 24, further comprising sensing from said signal the operativeness of said electrical circuit including said at least one first coil.

26. A method of sensing a condition of a magnetic circuit as recited in claim 21, wherein the operation of sensing a condition of said magnetic circuit comprises varying a frequency of said oscillatory first signal and sensing a response from said at least one electrical circuit responsive to said frequency.

27. A method of sensing a condition of a magnetic circuit as recited in claim 20, wherein said at least one electrical circuit comprises first and second electrical circuits and said at least one coil is electrically coupled to said first electrical circuit, the operation of adapting said at least one electrical circuit comprises electrically isolating said first and second electrical circuits from one another; magnetically coupling said first and second electrical circuits to one another; and operatively coupling at least one second capacitor in parallel with a second coil of said at least one coil so as to form a parallel circuit in said second electrical circuit; and the operation of sensing a condition of said magnetic circuit comprises sensing a voltage across said parallel circuit responsive to said time-varying magnetic flux in said magnetic circuit.

28. A method of sensing a condition of a magnetic circuit as recited in claim 20, wherein said at least one coil is operatively associated with a vehicle body or structure, said magnetic circuit comprises a door of the vehicle, and said condition of said magnetic circuit comprises whether or not said door is latched.

29. A method of sensing a condition of a magnetic circuit as recited in claim 20, wherein said at least one coil is operatively associated with a vehicle body or structure, said magnetic circuit comprises a door of the vehicle, and said condition of said magnetic circuit comprises whether or not said door is involved in a crash, further comprising controlling the actuation of a safety restraint system responsive to sensing said condition that said door is involved in said crash.

30. A method of sensing a condition of a magnetic circuit as recited in claim 20, wherein the operation of sensing a condition of said magnetic circuit comprises:
   a. sensing a signal selected from a measure responsive to or related to a resistance of said at least one first coil, a measure responsive to a phase angle between a voltage across said at least one first coil and a current through said at least one firs coil, a measure of reactive power applied to said at least one first coil, and a measure of real power absorbed by said at least one first coil; and
   b. comprising said signal with a threshold.

31. A magnetic sensor, comprising:
   at least one coil operatively associated with a magnetic circuit of a vehicle body or structure, wherein said at least one coil is adapted to cooperate with a time-varying magnetic flux in said vehicle body or structure, said time-varying magnetic flux is generated or sensed by said at least one coil, and said time-varying magnetic flux is responsive to a condition of said vehicle body or structure that is sensed by the magnetic sensor;
   at least one electrical circuit operatively coupled to said at least one coil, wherein said at least one electrical circuit is adapted so that said at least one coil in cooperation with said at least one electrical circuit exhibits a resonant or near-resonant condition in association with said time-varying magnetic flux for at least one condition of said vehicle body or structure; and
   c. a processor, a circuit, or a combination thereof adapted to determine at least one measure selected from a measure responsive to or related to a resistance of said at least one first coil, a measure responsive to a phase angle between a voltage across said at least one first coil and a current through said at least one first coil, a measure of reactive power applied to said at least one first coil, and a measure of real power absorbed by said at least one first coil.

* * * * *